United States Patent
Yamazaki et al.

(10) Patent No.: US 11,131,855 B2
(45) Date of Patent: Sep. 28, 2021

(54) DISPLAY SYSTEM AND METHOD FOR CONTROLLING DISPLAY SYSTEM

(71) Applicant: SEIKO EPSON CORPORATION, Tokyo (JP)

(72) Inventors: Akio Yamazaki, Matsumoto (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 14 days.

(21) Appl. No.: 16/664,983

(22) Filed: Oct. 28, 2019

(65) Prior Publication Data
US 2020/0133002 A1  Apr. 30, 2020

(30) Foreign Application Priority Data
Oct. 29, 2018  (JP) .............................. JP2018-202439

(51) Int. Cl.
*G02B 27/01* (2006.01)

(52) U.S. Cl.
CPC ..... *G02B 27/0172* (2013.01); *G02B 27/0101* (2013.01); *G02B 27/0176* (2013.01); *G02B 27/0179* (2013.01); *G02B 2027/0138* (2013.01); *G02B 2027/0181* (2013.01)

(58) Field of Classification Search
CPC .............. G02B 27/0172; G02B 27/017; G02B 27/0176; G02B 27/0179
See application file for complete search history.

(56) References Cited

U.S. PATENT DOCUMENTS

2016/0269631 A1* 9/2016 Jiang ........................ G09B 5/02
2017/0206710 A1* 7/2017 Touma ............... G02B 27/0093
2017/0372139 A1* 12/2017 Thomasson ............ B25J 9/1671

FOREIGN PATENT DOCUMENTS

JP          2017-100234 A       6/2017

\* cited by examiner

*Primary Examiner* — Kent W Chang
*Assistant Examiner* — Chayce R Bibbee
(74) *Attorney, Agent, or Firm* — Oliff PLC

(57) ABSTRACT

A display system includes an HMD and a PC. The HMD displays an image on a scene in a real space in an overlapped manner. The PC includes a first control unit. The first control unit causes the HMD to display a guide image indicating a direction set based on a robot to correspond to a robot arranged in the real space. On a tool of the robot, a tool coordinate system is set based on the tool. The first control unit displays the guide image indicating the tool coordinate system in accordance with a direction of the tool. The guide image includes an X-axis image, a Y-axis image, and a Z-axis image.

13 Claims, 9 Drawing Sheets

DISPLAY SYSTEM AND METHOD FOR CONTROLLING DISPLAY SYSTEM

The present application is based on, and claims priority from JP Application Serial Number 2018-202439, filed Oct. 29, 2018, the disclosure of which is hereby incorporated by reference herein in its entirety.

BACKGROUND

1. Technical Field

The present disclosure relates to a display system, and a method for controlling the display system.

2. Related Art

In the past, technology using a transmission-type display has been known in teaching a robot (see, for example, JP-A-2017-100234). A 3DCG drawing calculator described in JP-A-2017-100234 holds 3D model image data obtained by modeling a form of a robot arm in three dimensions. Then, the 3DCG drawing calculator processes the 3D model image data into an image overlapping a real view of the arm from a perspective of an operator, in accordance with operator's view position information, arm position information, and posture information. In addition, when a teaching operation is performed on an operation of the arm by the operator, the 3DCG drawing calculator generates path image data for displaying a movement path of a tip of the arm as an image, and generates image data synthesized with the processed 3D model image data. In addition, the 3DCG drawing calculator processes such that a portion of the image data in which the arm is present is shown in transparent colors, and transmits the processed image data to the transmission-type display. The transmission-type display causes a display unit to display the transmitted image data.

SUMMARY

An object of the present disclosure is to provide a display system capable of enhancing convenience for a user, and a method for controlling the display system.

An aspect for achieving the object described above is a display system that includes a head-mounted display unit configured to display an image on a scene in a real space in an overlapped manner, and a first control unit configured to cause the display unit to display a guide image indicating a direction set based on a control target object to correspond to the control target object disposed in the real space, wherein on a target location of the control target object, a coordinate system based on the target location is set, and the first control unit is configured to display the guide image indicating the coordinate system corresponding to a direction of the target location.

The above-described display system may be configured such that, the control target object includes a motion mechanism configured to at least move or rotate the target location with respect to the display unit.

The display system described above may be configured such that a plurality of the target locations and the coordinate system based on each of the target locations are set for the control target object, and the first control unit is configured to identify a location and a direction of each of the target locations, and display the guide image corresponding to the position and the direction of each of the target locations.

The display system described above may be configured such that the display unit includes an imaging unit, and the first control unit is configured to identify the location and the direction of the target location with respect to the display unit, based on a captured image captured by the imaging unit, and display the guide image corresponding to the position and the direction of the target location.

The display system described above may be configured such that the first control unit is configured to detect, from the captured image, an image marker provided at the target location of the control target object to identify the location and the direction of the target location with respect to the display unit.

The display system described above may be configured such that a plurality of the target locations are set on the control target object, and the first control unit is configured to detect, from the captured image to identify, the image marker provided at each of the target locations of the control target object the location and the direction of each of the target locations with respect to the display unit.

The display system described above may be configured such that the first control unit is configured to determine, based on a line-of-sight of a user wearing the display unit on a head, one of the image markers provided respectively at the target locations, and display the guide image corresponding to the one image marker.

The display system described above may be configured such that the first control unit is configured to determine a size of the guide image in accordance with a distance between the display unit and the target location of the control target object.

The display system described above may be configured such that a display device having the display unit, and a control device communicably coupled to the control target object and the display device, and including the first control unit are included.

The display system described above may be configured such that an input unit configured to receive an input regarding an operation of the control target object, and a second control unit configured to cause the control target object to operate corresponding to the input are included, and the first control unit is configured to cause the display unit to update display of the guide image corresponding to the operation of the control target object.

The display system described above may be configured such that the first control unit is configured to cause the display unit to display a state image indicating a state of the control target object to correspond to the control target object installed in the real space.

The display system described above may be configured such that the first control unit is configured to cause the display unit to display a region guide image for guiding a region in which the control target object moves to correspond to the control target object installed in the real space.

The above-described display system may be configured such that the control target object is a robot having at least one of a plurality of joints and a plurality of shafts.

Another aspect for achieving the object described above is a control method for a display system including a head-mounted display unit configured to display an image on a scene in a real space in an overlapped manner, the method including a display step of causing the display unit to display a guide image indicating a direction set based on a control target object to correspond to the control target object disposed in the real space.

DESCRIPTION OF EXEMPLARY EMBODIMENTS

An exemplary embodiment of the present disclosure will be described below with reference to the accompanying drawings.

Figure 1:
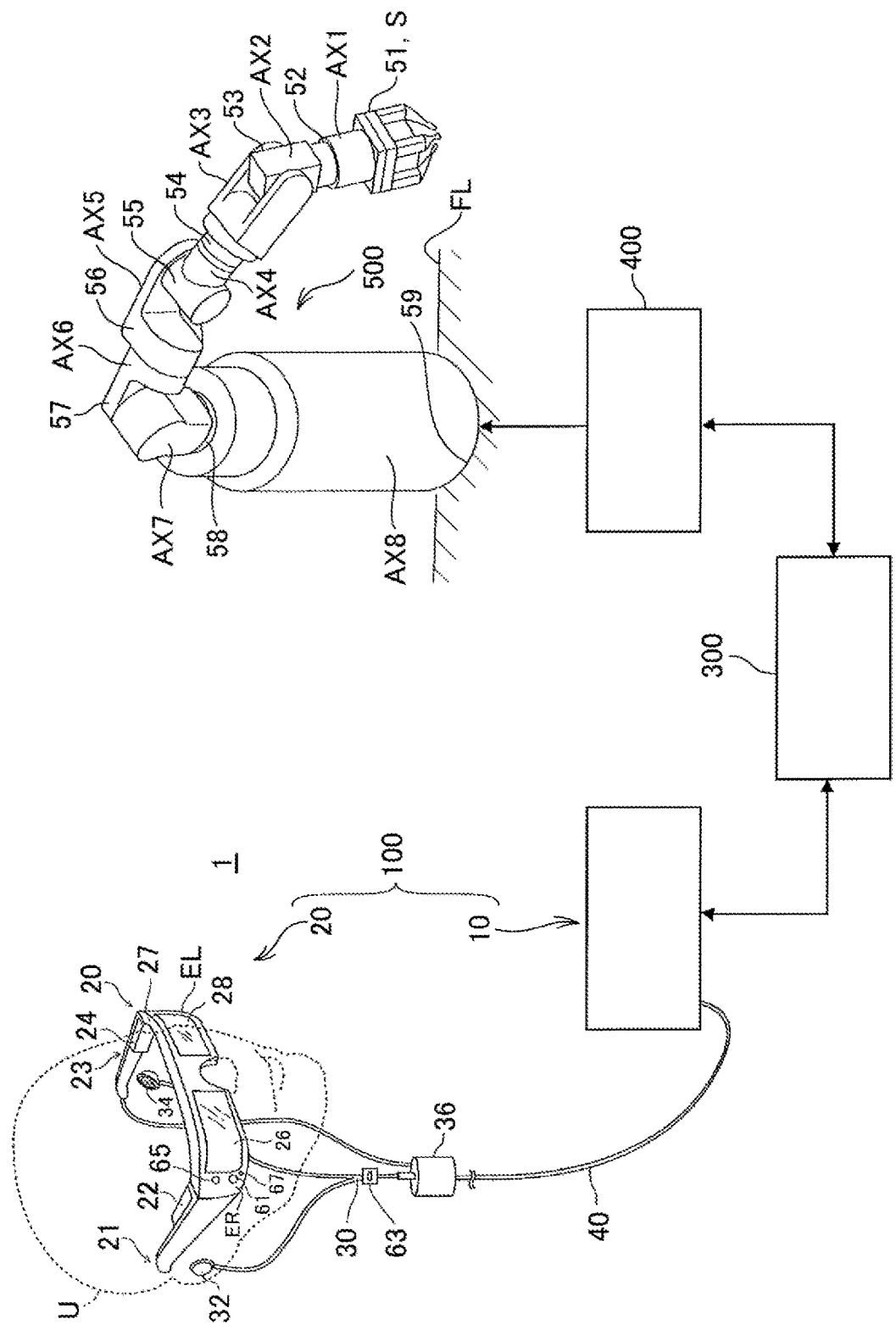
FIG. 1 is a diagram illustrating an overall configuration of a display system.

First, a display system 1 according to the exemplary embodiment of the present disclosure will be described with reference to FIG. 1. FIG. 1 is a diagram illustrating an overall configuration of the display system 1.

As illustrated in FIG. 1, the display system 1 includes an HMD 100 which is a head-mounted display device, a PC 300, a controller 400, and a robot 500. HMD is an abbreviation for a "Head Mounted Display". The HMD 100 is a device including an image display unit 20 mounted on a head of a user and a connection device 10, in which the image display unit 20 in a state of being mounted on the head of the user causes the user to visually recognize a virtual image. The image display unit 20 corresponds to the "display unit" of the present disclosure. Further, the HMD 100 corresponds to the "display device" of the present disclosure. In the following description, the user refers to a user who wears and uses the HMD 100.

The PC 300 is communicably coupled to each of the HMD 100 and the controller 400. The PC 300 causes the HMD 100 to display a guide image P1, a status image P2, and a region guide image P3 on a scene in a real space in an overlapped manner. The scene in the space includes the robot 500.

The guide image P1 indicates a direction set based on the robot 500. Specifically, the guide image P1 indicates a tool coordinate system TC corresponding to a direction of a tool of the robot 500. The tool coordinate system TC includes an X-axis, a Y-axis, and a Z-axis.

The status image P2 indicates a state of the HMD 100. The status image P2 corresponds to an example of the "state image." The guide image P1 and the status image P2 will be described below with reference to FIG. 3, FIG. 5, and FIG. 6. The region guide image P3 will be described below with reference to FIG. 3 and FIG. 7.

PC is an abbreviation for a "Personal Computer". The PC 300 corresponds to an example of the "control device". Note that, the PC 300 is merely an example of the "control device". For example, a desktop PC, a notebook PC, a tablet PC, a smartphone, and the like may be coupled to the connection device 10 as the "control device". As an aspect of a PC functioning as the "control device", a so-called stick-type PC having a stick-type main body directly coupled to a connector 11 of the connection device 10 may be used.

The robot 500 corresponds to an example of the "control target object". The robot 500 has a plurality of joints and a plurality of shafts. Specifically, the robot 500 has a tool 51, a first joint 52, a second joint 53, a third joint 54, a fourth joint 55, a fifth joint 56, a sixth joint 57, a seventh joint 58, and an eighth joint 59. Further, the robot 500 includes a first shaft member AX1, a second shaft member AX2, a third shaft member AX3, a fourth shaft member AX4, a fifth shaft member AX5, a sixth shaft member AX6, a seventh shaft member AX7, and an eighth shaft member AX8. Each of the first shaft member AX1 to the eighth shaft member AX8 constitutes a so-called "link".

The tool 51 is configured to be driven by a motor to grasp an object. The object is a component such as a screw, a spring, or the like, constituting a device. The device is, for example, an automobile. In other words, the robot 500 is configured to assemble an automobile, for example.

A sensor S is disposed in the tool 51. The sensor S is configured to detect grasping force of the tool 51.

The tool 51 is disposed at a tip end of the first shaft member AX1. The first shaft member AX1 couples the tool 51 and the first joint 52. The tool 51 and the first shaft member AX1 are integrally formed. The first shaft member AX1 is rotatably supported by the first joint 52. The first shaft member AX1 is configured to be rotationally driven by a motor in the first joint 52. The first joint 52 is disposed at a base end of the first shaft member AX1.

Note that, the tip end indicates an end proximate to the tool 51, and the base end indicates an end that is spaced from the tool 51.

In the present exemplary embodiment, the sensor S is disposed in the tool 51, but the present disclosure is not limited thereto. A camera may be disposed in the tool 51. In this case, the tool 51 can be more easily manipulated because a positional relationship between the tool 51 and a surrounding object can be grasped.

In the present exemplary embodiment, the sensor S is disposed in the tool 51, but the present disclosure is not limited thereto. Various sensors may be disposed in the tool 51. For example, a force sensor may be disposed in the tool 51. For example, by displaying detection results of the force sensor as the status image P2, efficiency of teaching can be improved.

For example, a torque sensor may be disposed in the tool 51. In this case, the tool 51 can grasp a screw to facilitate an operation of twisting into a screw hole. For example, when torque is too large, it can be determined that respective positions of the screw hole and a thread do not match.

Additionally, a pressure sensor may also be disposed in the tool 51, for example. In this case, the tool 51 can grasp a member to facilitate an operation of fitting into a hole. For example, when pressure is too large, it can be determined that respective positions of the hole and the member do not match.

The first joint 52 is disposed at a tip end of the second shaft member AX2. The second shaft member AX2 couples the first joint 52 and the second joint 53. The second shaft member AX2 is rotatably supported by the second joint 53. The second shaft member AX2 is configured to be rotationally driven by a motor in the second joint 53. The second joint 53 is disposed at a base end of the second shaft member AX2.

The second joint 53 is disposed at a tip end of the third shaft member AX3. The third shaft member AX3 couples the second joint 53 and the third joint 54. The third shaft member AX3 is rotatably supported by the third joint 54. The third shaft member AX3 is configured to be rotationally driven by a motor in the third joint 54. The third joint 54 is disposed at a base end of the third shaft member AX3.

Each of the third joint 54 to the seventh joint 58 and each of the fourth shaft member AX4 to the seventh shaft member AX7 are configured similarly to each of the first joint 52 to the third joint 54 and each of the second shaft member AX2 and the third shaft member AX3, and thus descriptions thereof will be omitted.

The eighth shaft member AX8 is rotatably supported by the eighth joint 59. The eighth shaft member AX8 is configured to be rotationally driven by a motor in the eighth joint 59. The eighth joint 59 is disposed at a base end of the eighth shaft member AX8. Specifically, the eighth joint 59 is disposed on a floor FL.

The respective motors that are configured to rotationally drive the first shaft member AX1 to the eighth shaft member AX8 correspond to an example of the "motion mechanism".

Each of the tool 51 and the first shaft member AX1 to the eighth shaft member AX8 corresponds to an example of the "target location".

Note that, in the exemplary embodiment of the present disclosure, the robot 500 includes the first joint 52 to the eighth joint 59, and the first shaft member AX1 to the eighth shaft member AX8, however, the present disclosure is not limited thereto. It is sufficient that the robot 500 has at least one of the plurality of joints and the plurality of shafts.

The robot 500 is configured to operate based on offline data and teaching data. The offline data is generated without using the machine body of the robot 500, and indicates the data for instructing an operation of the robot 500.

The teaching data indicates data for modifying the offline data by using the machine body of the robot 500. The teaching data is generated based on instructions from the user.

The exemplary embodiment of the present disclosure describes a case of generating the teaching data for the robot 500.

The controller 400 is configured to receive a manipulation from the user and control an operation of the robot 500 based on a manipulation signal indicating the manipulation. Specifically, the controller 400 is configured to receive a manipulation from the user for the tool 51, and control an operation of the robot 500, based on a manipulation signal indicating the manipulation.

The controller 400 is configured to transmit manipulation information indicating the manipulation to the PC 300 as the teaching data.

Figure 2:
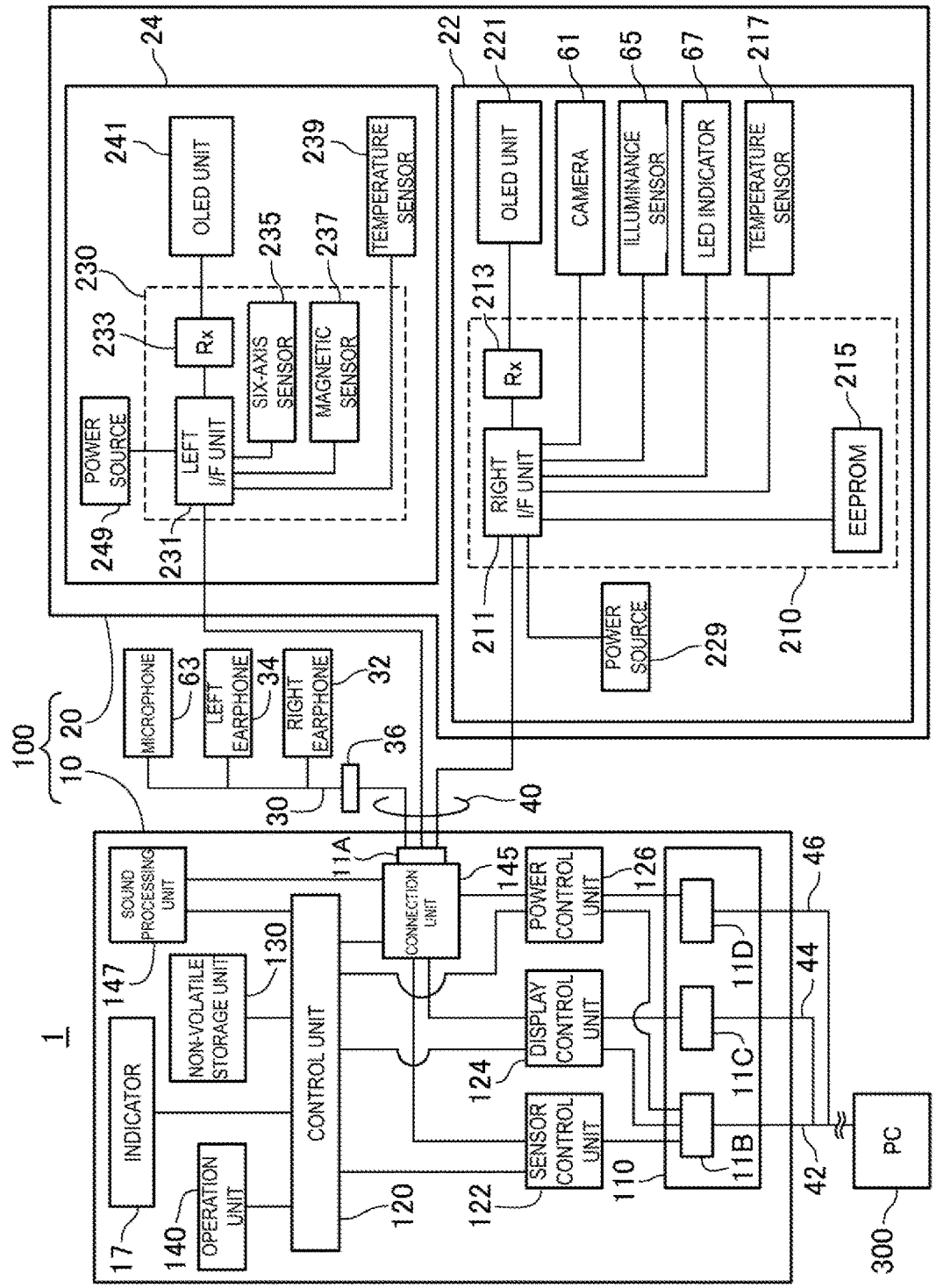
FIG. 2 is a diagram illustrating a configuration of an HMD.

Next, a configuration of the HMD 100 will be described with reference to FIG. 1 and FIG. 2. FIG. 2 is a diagram illustrating the configuration of the HMD 100.

As illustrated in FIG. 2, the connection device 10 includes a connector 11A, a connector 11B, a connector 11C, and a connector 11D. The image display unit 20 is coupled to the connector 11A via a display unit connection cable 40. Hereinafter, in a case where the connectors 11A, 11B, 11C, and 11D are not distinguished, the connectors 11A, 11B, 11C, and 11D will be referred to as the connectors 11.

The display system 1 is a system configured by coupling the PC 300 to the HMD 100. The connectors 11B, 11C and 11D are interfaces to which the PC 300 is coupled.

The connectors 11 are wired interfaces to be coupled to a communication cable, and the connection device 10 is coupled to an external device via the communication cable. The connector 11A includes a terminal configured to couple the display unit connection cable 40 and an interface circuit configured to transmit and receive a signal via the connector 11A. Similarly, the connector 11B includes a terminal configured to couple a cable and an interface circuit configured to transmit and receive a signal via the connector 11B. The same applies to the connectors 11C and 11D as well.

The connector 11A is provided to couple the image display unit 20 to the connection device 10. The display unit connection cable 40 is configured to supply power from the connection device 10 to the image display unit 20, and has a function for the image display unit 20 and the connection device 10 to transmit and receive data to and from each other.

For example, the connectors 11B, 11C and 11D are connectors conforming to a known communication interface standard, and may be connectors having the same shape, or may be connectors having different types.

In the exemplary embodiment of the present disclosure, as an example, the connector 11B is an interface supporting input/output of image data and various types of data, and to which the PC 300 is coupled via a first connection cable 42. The connector 11C is an interface supporting at least input/output of image data, and to which the PC 300 is coupled via a second connection cable 44. The connector 11D is an interface supporting at least power supply for the connection device 10, and to which the PC 300 is coupled via a third connection cable 46.

For example, a connector of a USB Type-C standard can be adopted as the connector 11B. An interface supporting USB Type-C is capable of transmitting data according to a USB 3.1 standard and supplying a direct current of 20 volts or less, and 5 amperes or less. Further, as a function of an alternative mode of USB Type-C, HDMI standard image data, MHL standard image data, and the like can be transmitted. The PC 300 can perform power supply, transmission and reception of data, supply of streaming data for images and audio, and the like via the first connection cable 42. Here, USB is an abbreviation for a "Universal Serial Bus". MHL is an abbreviation for a "Mobile High-definition Link", and HDMI is an abbreviation for a "High Definition Multimedia Interface". The alternative mode of USB Type-C is known as an "Alternative Mode". HDMI is a registered trademark.

For example, a connector conforming to the HDMI standard can be adopted as the connector 11C. Further, the connector 11D can adopt a connector of the USB Type-C standard or a MicroUSB connector. A connector of an interface standard capable of transmitting data and supplying power can be adopted as the connector 11D, and the connection device 10 can be configured to perform only supplying power by the connector 11D.

The PC 300 is coupled to the connector 11B via the first connection cable 42, and data indicating an image generated by a camera 61 is output to the PC 300. The camera 61 will be described below with reference to FIG. 1. To the connector 11C, the PC 300 is coupled that outputs data indicating the guide image P1, the status image P2, and the region guide image P3 by the second connection cable 44. The PC 300 is configured to generate the guide image P1, the status image P2, and the region guide image P3. Further, to the connector 11D, the PC 300 is coupled that outputs a DC power supply of 5 volts via the third connection cable 46, and the connection device 10 is configured to receive power supply by the connector 11D.

As illustrated in FIG. 1, the image display unit 20 has an eyeglasses-like shape in the exemplary embodiment of the present disclosure. The image display unit 20 includes a main body including a right holding part 21, a left holding part 23, and a front frame 27. The main body further includes a right display unit 22, a left display unit 24, a right light-guiding plate 26, and a left light-guiding plate 28.

The right holding part 21 and the left holding part 23 extend rearward from respective ends of the front frame 27, to hold the image display unit 20 on a head U of the user. One of the ends of the front frame 27, which lies on the right side of the head U when the image display unit 20 is worn, is referred to as an end ER, while the other one of the ends, which lies on the left side, is referred to as an end EL. The right holding part 21 is provided to extend from the end ER of the front frame 27 to a position corresponding to the right side of the head of the user in a state where the image display unit 20 is worn. The left holding part 23 is provided to extend from the end EL to a position corresponding to the left side of the head of the user in a state where the image display unit 20 is worn.

The right light-guiding plate 26 and the left light-guiding plate 28 are provided on the front frame 27. The right light-guiding plate 26 is located in front of the right eye of the user in a state where the user wears the image display unit 20, and causes the user to visually recognize an image with the right eye. The left light-guiding plate 28 is located in front of the left eye of the user in a state where the user wears the image display unit 20, and causes the user to visually recognize an image with the left eye. The image includes the guide image P1, the status image P2, and the region guide image P3.

The front frame 27 has a shape formed by coupling an end of the right light-guiding plate 26 and an end of the left light-guiding plate 28 to each other, and this coupling position corresponds to a position between eyebrows of the user in a state where the user wears the image display unit 20. The front frame 27 may include a nose pad provided in the coupling position of the right light-guiding plate 26 and the left light-guiding plate 28, and configured to abut on a nose of the user in a state where the user wears the image display unit 20. In this case, the image display unit 20 can be held to the head of the user by the nose pad, the right holding part 21, and the left holding part 23. Additionally, a belt configured to be in contact with a back of the head of the user in a state where the user wears the image display unit 20 may be coupled to the right holding part 21 and the left holding part 23, and in this case, the image display unit 20 can be held to the head of the user by the belt.

Each of the right display unit 22 and the left display unit 24 is a module obtained by unitizing an optical unit and a peripheral circuit.

The right display unit 22 is a unit related to display of an image by the right light-guiding plate 26, and is provided on the right holding part 21 and is located in the vicinity of the right side head part of the user in the mounted state. The left display unit 24 is a unit related to image display by the left light-guiding plate 28, and is provided on the left holding part 23 and is located in the vicinity of the left side head part of the user in the mounted state. Note that, the right display unit 22 and the left display unit 24 may be collectively and simply referred to as a "display driving unit".

The right light-guiding plate 26 and the left light-guiding plate 28 are optical members formed of a light transmissive resin or the like, and are configured to guide imaging light output by the right display unit 22 and the left display unit 24 to the eyes of the user. The right light-guiding plate 26 and the left light-guiding plate 28 are, for example, prisms.

A dimmer plate may be provided on each of the surfaces of the right light-guiding plate 26 and the left light-guiding plate 28. The dimmer plate is an optical element being on a thin plate and having a different transmittance according to the wavelength range of light, and functions as a so-called wavelength filter. The dimmer plate is, for example, disposed to cover a front side of the front frame 27, which is an opposite side to a side of the eyes of the user. By appropriately selecting optical properties of this dimmer plate, a transmittance of light in any wavelength range such as visible light, infrared light, and ultraviolet light can be adjusted, and a light amount of outside light entering the right light-guiding plate 26 and the left light-guiding plate 28 from an outside and passing through the right light-guiding plate 26 and the left light-guiding plate 28 can be adjusted.

The HMD 100 is a so-called "see-through type" display device, and the imaging light guided by the right light-guiding plate 26 and the outside light transmitted through the right light-guiding plate 26 are incident on the right eye of the user. Similarly, the imaging light guided by the left light-guiding plate 28 and the outside light transmitted through the left light-guiding plate 28 are incident on the left eye. As described above, the HMD 100 allows the imaging light corresponding to the image processed internally and the outside light to be incident on the eyes of the user in an overlapped manner, and the user can see an external scene through the right light-guiding plate 26 and the left light-guiding plate 28, and can visually recognize the image based on the imaging light overlapping on the external scene.

The external scene corresponds to the "scene in the real space".

An illuminance sensor 65 is arranged on the front frame 27 of the image display unit 20. The illuminance sensor 65 is configured to receive outside light coming from a front of the user wearing the image display unit 20.

The camera 61 is arranged on the front frame 27 of the image display unit 20. An imaging range and an imaging direction of the camera 61 will be described later. The camera 61 is provided at a position that the outside light passing through the right light-guiding plate 26 and the left light-guiding plate 28 is not blocked. In the example of FIG. 1, the camera 61 is disposed on a side of the end ER of the front frame 27, but the camera may also be disposed on a side of the end EL, or may be disposed at a coupling portion between the right light-guiding plate 26 and the left light-guiding plate 28.

The camera 61 corresponds to an example of the "imaging unit".

The camera 61 is a digital camera including an imaging element such as a CCD and a CMOS, an imaging lens and the like, and the camera 61 according to the present exemplary embodiment of the present disclosure is a monocular camera, but may be configured by a stereo camera. The camera 61 is configured to capture an outside scene in a front side direction of the user in a state where the HMD 100 is worn. An angle of view of the camera 61 is oriented in a front direction of the user, and a range of the external scene captured by the camera 61 includes a range of an external scene that the user visually recognizes through the image display unit 20. For example, the range of the external scene captured by the camera 61 matches the range of the external scene that the user visually recognizes through the image display unit 20. The external scene is a scene in an external real space perceived by the user with the naked eye. The angle of view of the camera 61 can be appropriately set.

An LED indicator 67 is disposed on the front frame 27. The LED indicator 67 is disposed in the vicinity of the camera 61 at the end ER and is configured to light up while the camera 61 is operating to notify that the capturing is in progress.

Each of the right display unit 22 and the left display unit 24 of the image display unit 20 is coupled to the connection device 10. In the HMD 100, the display unit connection cable 40 is coupled to the left holding part 23, and wiring coupled to this display unit connection cable 40 is laid inside the image display unit 20 to couple each of the right display unit 22 and the left display unit 24 to the connection device 10.

The connection cable 40 includes an audio connector 36, wherein a headset 30 including a right earphone 32 and a left earphone 34 constituting a stereo headphone, and a microphone 63, is coupled to the audio connector 36. The right earphone 32 is mounted on the right ear of the user and the left earphone 34 is mounted on the left ear of the user. The right earphone 32 and the left earphone 34 can also be referred to as a sound output unit.

The right earphone 32 and the left earphone 34 output a sound based on a sound signal output from the connection device 10.

The microphone 63 is configured to collect a sound and outputs the sound signal to the connection device 10. The microphone 63 may be, for example, a monaural microphone or a stereo microphone, or may be a directional microphone or a non-directional microphone.

The connection device 10 includes a power button, a brightness adjusting button, and a sound volume adjusting button (not illustrated) as operated parts to be operated by the user. These operated parts are disposed on the surface of the main body of the connection device 10, and may be operated by fingers of the user, for example.

The power button is a button configured to instruct turning on/off the power of the HMD 100. The brightness adjustment button is a button configured to adjust display brightness of an image displayed by the image display unit 20. The brightness adjusting button is configured to instruct an increase in brightness, and the brightness adjusting button is configured to instruct a reduction in brightness. The volume adjusting button is a button configured to adjust volume of a sound output from the right earphone 32 and the left earphone 34. The volume adjusting button is configured to instruct an increase in volume, and the sound volume adjusting button is configured to instruct a reduction in volume.

Further, the connection device 10 includes an indicator (not illustrated) configured to display an operation state of the HMD 100. The indicator includes, for example, an LED, and is configured to light up in red in a case where the power of the HMD 100 is on. Here, LED is an abbreviation for a "Light Emitting Diode". Additionally, the indicator is configured to light up in white in a case of receiving an operation on the operated parts described above.

As illustrated in FIG. 2, the right display unit 22 of the image display unit 20 has a right display unit substrate 210. On the right display unit substrate 210, a right I/F unit 211 coupled to the display unit connection cable 40, a reception unit 213 that receives data input from the connection device 10 via the right I/F unit 211, and an EEPROM 215 are mounted. The right I/F unit 211 couples the reception unit 213, the EEPROM 215, a temperature sensor 217, the camera 61, the illuminance sensor 65, and the LED indicator 67 to the connection device 10. The reception unit 213 couples an OLED unit 221 to the connection device 10.

The left display unit 24 includes a left display unit substrate 230. On the left display unit substrate 230, a left I/F unit 231 coupled to the display unit connection cable 40, a reception unit 233 that receives data input from the connection device 10 via the left I/F unit 231 are mounted. Further, the left display unit substrate 230 is mounted with a six-axis sensor 235 and a magnetic sensor 237.

The left I/F unit 231 couples the reception unit 233, the six-axis sensor 235, the magnetic sensor 237, and a temperature sensor 239 to the connection device 10. The reception unit 233 couples an OLED unit 241 to the connection device 10.

I/F is an abbreviation for "Interface". EEPROM is an abbreviation for an "Electrically Erasable Programmable Read-Only Memory". OLED is an abbreviation for an "Organic Light Emitting Diode". In the following description, the reception unit 213 and the reception unit 233 will be referred to as Rx 213 and Rx 233, respectively.

The EEPROM 215 is configured to store various types of data in a non-volatile manner. The EEPROM 215 is configured to store, for example, data about light-emitting properties and display properties of the OLED units 221 and 241 provided in the image display unit 20, data about a property of a sensor provided in the right display unit 22 or the left display unit 24, and the like. Specifically, the EEPROM 215 stores parameters regarding gamma correction of the OLED units 221 and 241, data used to compensate for detection values of the temperature sensors 217 and 239, and the like. These kinds of data are generated by inspection at the time of factory shipment of the HMD 100, and are written into the EEPROM 215. The data stored in the EEPROM 215 can be read by a control unit 120.

The camera 61 is configured to perform capturing of an image in accordance with a signal input via the right I/F unit 211 and output captured image data to the right I/F unit 211. The illuminance sensor 65 is configured to receive the outside light and output a detection value corresponding to an amount of the received light or an intensity of the received light. The LED indicator 67 is configured to light up in accordance with a control signal or a driving current input via the right I/F unit 211.

The temperature sensor 217 is configured to detect a temperature of the OLED unit 221, and outputs a voltage value or a resistance value corresponding to the detected temperature as a detection value.

The reception unit 213 is configured to receive image data for displaying transmitted from the connection device 10 via the right I/F unit 211, and output to the OLED unit 221. The OLED unit 221 is configured to display an image based on the image data transmitted by the connection device 10.

Additionally, the reception unit 233 is configured to receive image data for displaying transmitted from the connection device 10 via the left I/F unit 231, and output to the OLED unit 241. The OLED units 221 and 241 are configured to display an image based on the image data transmitted by the connection device 10.

The image includes the guide image P1, the status image P2, and the region guide image P3.

The six-axis sensor 235 is a motion sensor including a three-axis acceleration sensor and a three-axis gyro sensor. The six-axis sensor 235 may adopt an IMU in which the sensors described above are provided as modules. The magnetic sensor 237 is a three-axis geomagnetic sensor, for example. A gyro sensor is also referred to as an angular velocity sensor. In addition, a motion sensor may be paraphrased as an inertial sensor. IMU is an abbreviation for an "Inertial Measurement Unit".

The temperature sensor 239 is configured to detect a temperature of the OLED unit 241, and output a voltage value or a resistance value corresponding to the detected temperature as a detection value.

Each part of the image display unit 20 is configured to operate with power supplied from the connection device 10 via the display unit connection cable 40.

In the image display unit 20, a power source 229 is included in the right display unit 22, and a power source 249 is included in the left display unit 24. The power source 229 is configured to distribute and supply the power supplied by the connection device 10 via the display unit connection cable 40 to each part of the right display unit 22 including the right display unit substrate 210. Similarly, the power source 249 is configured to distribute and supply the power supplied by the connection device 10 via the display unit connection cable 40 to each part of the left display unit 24 including the left display unit substrate 230. The right display unit 22 and the left display unit 24 may include a conversion circuit or the like configured to convert a voltage.

The connection device 10 includes an I/F unit 110, the control unit 120, a sensor control unit 122, a display control unit 124, a power control unit 126, a non-volatile storage unit 130, an operating unit 140, a connection unit 145, and a sound processing unit 147.

The I/F unit 110 includes the connectors 11B, 11C and 11D. Further, the I/F unit 110 includes an interface circuit coupled to the connectors 11B, 11C, and 11D and configured to execute communication protocols conforming to respective communication standards.

The I/F unit 110 may be, for example, an interface substrate on which the connectors 11B, 11C, and 11D and the interface circuit are mounted. Further, a configuration may be adopted in which the control unit 120, the sensor control unit 122, the display control unit 124, and the power control unit 126 of the connection device 10 are mounted on a connection device main substrate (not illustrated). In this case, on the connection device main substrate, the connectors 11B, 11C, and 11D of the I/F unit 110 and the interface circuit may be mounted.

Additionally, the I/F unit 110 may include, for example, an interface for a memory card capable of being coupled to an external storage device or an external storage medium, or the like, or the I/F unit 110 may be configured by a wireless communication interface.

The control unit 120 is configured to control each part of the connection device 10. The control unit 120 is configured to execute a program by a processor 150 (not illustrated), and control each unit of the HMD 100 in cooperation of software and hardware. The control unit 120 is coupled to the non-volatile storage unit 130, the operating unit 140, the connection unit 145, and the sound processing unit 147.

The sensor control unit 122 is configured to control the camera 61, the illuminance sensor 65, the temperature sensor 217, the six-axis sensor 235, the magnetic sensor 237, and the temperature sensor 239. Specifically, the sensor control unit 122 is configured to perform setting and initialization of a sampling period of each sensor according to control of the control unit 120, and execute energization to each sensor, transmission of control data, acquisition of detection values and the like, corresponding to the sampling period of each sensor.

The sensor control unit 122 is coupled to the connector 11B of the I/F unit 110, and is configured to output the data regarding the detection value acquired from each sensor to the connector 11B at a preset timing. A device coupled to the connector 11B can acquire a detection value of each sensor of the HMD 100 and captured image data of the camera 61. In the present exemplary embodiment of the present disclosure, the detection value of each sensor and the captured image data of the camera 61 are output to the PC 300 by the sensor control unit 122. The data output by the sensor control unit 122 may be digital data including the detection value. Further, the sensor control unit 122 may be configured to output data of results obtained by an arithmetic operation based on the detection value of each sensor. For example, the sensor control unit 122 is configured to integrally process detection values of a plurality of sensors, and to function as a so-called sensor fusion processing unit. The sensor control unit 122 is configured to execute sensor fusion to output data determined from the detection values of the sensors, for example, track data of movement of the image display unit 20, and relative coordinate data of the image display unit 20, and the like. The sensor control unit 122 may have a function of transmitting/receiving various kinds of control data relating to transmission of data to/from a device coupled to the connector 11B.

The display control unit 124 is configured to execute various kinds of processing for the image display unit 20 to display an image based on image data input to the I/F unit 110. For example, the display control unit 124 is configured to execute various kinds of processing such as cutting out of a frame, resolution conversion, intermediate frame generation, and frame rate conversion. Resolution conversion includes so-called scaling. The display control unit 124 is configured to output image data corresponding to each of the OLED unit 221 and the OLED unit 241 to the connection unit 145. The image data input to the connection unit 145 is transmitted from the connector 11A to the right I/F unit 211 and the left I/F unit 231.

For example, when the image data input to the I/F unit 110 is 3D image data, the display control unit 124 is configured to execute 3D image decoding. The 3D image includes a stereoscopic image in a broad sense. In processing of the 3D image decoding, the display control unit 124 is configured to generate a frame for the right eye and a frame for the left eye from the 3D image data. Examples of a format of the 3D image data input to the I/F unit 110 include a side by side format, a top and bottom format, and a frame packing format, for example, but 3D model data may be used.

The display control unit 124 is coupled to the connector 11B and the connector 11C. The display control unit 124 is configured to execute processing on image data input to the connector 11B and image data input to the connector 11C, as an object to be processed. Additionally, the display control unit 124 may have a function to transmit/receive various kinds of control data about transmission of image data to/from a device coupled to the connector 11B or the connector 11C.

In the present exemplary embodiment of the present disclosure, the connector 11B is configured by a USB Type-C connector. The display control unit 124 is configured to receive image data transmitted in a USB Type-C alternative mode via the connector 11B. The connector 11C is, for example, an HDMI interface, and the display control unit 124 is configured to receive image data in an HDMI format input to the connector 11C.

The sensor control unit 122 and/or the display control unit 124 may be realized by cooperation of software and hardware by a processor executing a program. That is, the sensor control unit 122 and the display control unit 124 are configured by a processor to execute a program to execute the operations described above. In this example, the sensor control unit 122 and the display control unit 124 may be realized by a processor constituting the control unit 120 executing a program. In other words, the processor may function as the control unit 120, the display control unit 124 and the sensor control unit 122 by executing the program. Here, the processor can be paraphrased as a computer.

Further, the display control unit 124 and the sensor control unit 122 may be configured with programmed hardware such as a DSP or an FPGA. Further, the sensor control unit 122 and the display control unit 124 may be integrated to be configured of an SoC-FPGA. DSP is an abbreviation for a "Digital Signal Processor", FPGA is an abbreviation for a "Field Programmable Gate Array", and SoC is an abbreviation for a "System-on-a-Chip".

The power control unit 126 is coupled to the connector 11B and the connector 11D. The power control unit 126 is configured to, based on power supplied from the connectors 11B and 11D, supply power to each part of the connection device 10 and to the image display unit 20. Additionally, the power control unit 126 may include a voltage conversion circuit (not illustrated), and may be configured to convert a voltage to supply to each part of the connection device 10 and the image display unit 20. The power control unit 126 may be configured of a programmed semiconductor device such as a logic circuit and the FPGA. Further, the power control unit 126 may be configured of hardware common to the sensor control unit 122 and/or the display control unit 124.

Each of the sensor control unit 122, the display control unit 124, and the power control unit 126 may include a work memory for executing data processing, and may execute processing by using a memory 160 (not illustrated) of the control unit 120.

The operating unit 140 is configured to detect an operation on an operated part included in the connection device 10 and outputs data indicating an operation content or an operation signal indicating the part to be operated to the control unit 120.

The sound processing unit 147 is configured to generate a sound signal according to sound data that is input from the control unit 120, and output the sound signal to the connection unit 145. This sound signal is output from the connection unit 145 to the right earphone 32 and the left earphone 34 via the audio connector 36. Additionally, the sound processing unit 147 is configured to adjust the volume of the sound signal under the control of the control unit 120. Additionally, the sound processing unit 147 is configured to generate sound data of the sound collected by the microphone 63, and output the sound data to the control unit 120. This sound data may be processed in the same manner as the detected value of the sensor included in the image display unit 20 by the control unit 120.

Additionally, the connection device 10 may include a battery (not illustrated), and may be configured to supply power to each part of the connection device 10 and the image display unit 20 from this battery. The battery included the connection device 10 may be a rechargeable secondary battery.

Figure 3:
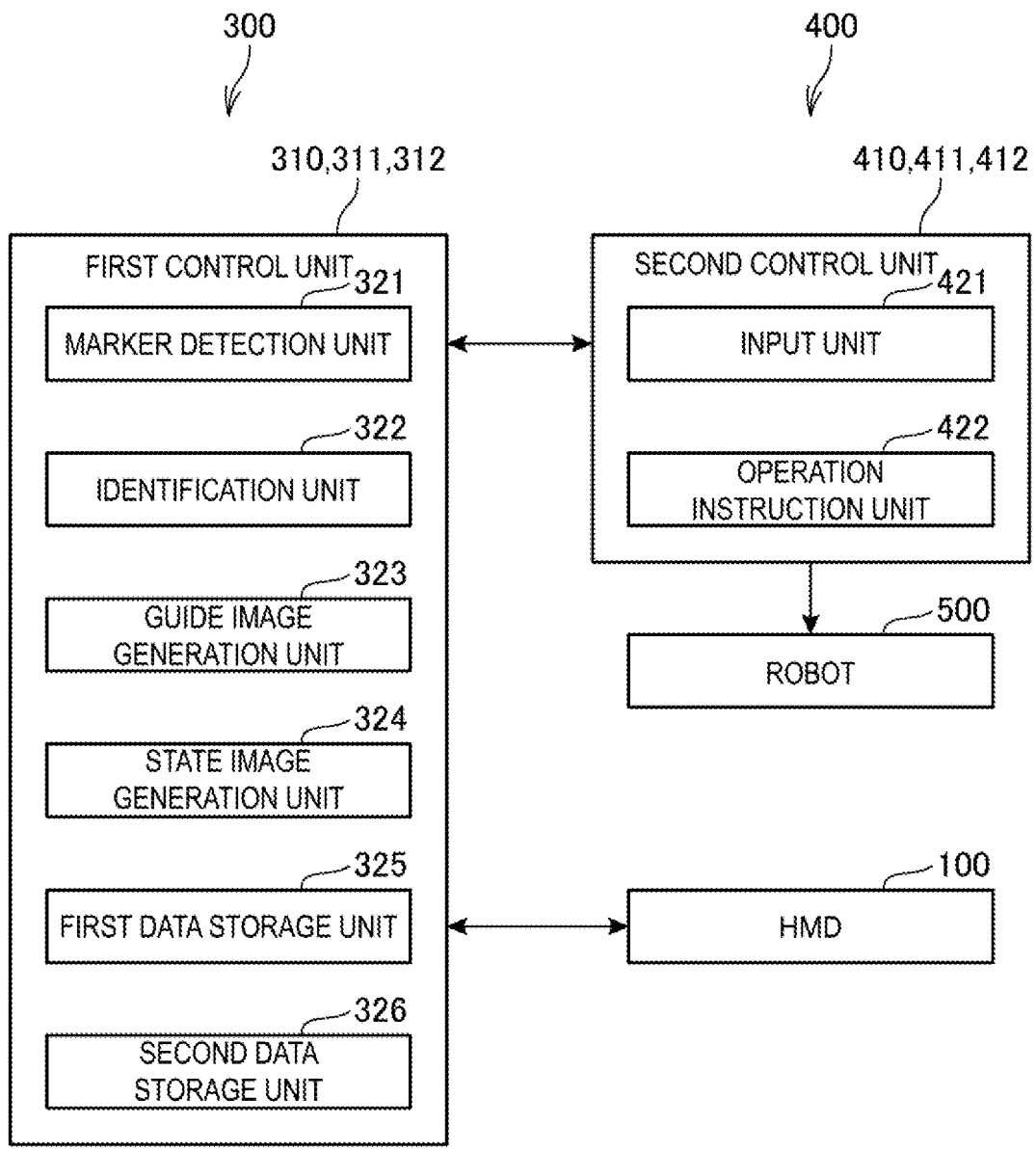
FIG. 3 is a diagram illustrating a configuration of a first control unit and a second control unit.

Next, configurations of a first control unit 310 and a second control unit 410 will be described with reference to FIG. 1 to FIG. 3. FIG. 3 is a diagram illustrating configurations of the first control unit 310 and the second control unit 410.

The PC 300 includes the first control unit 310.

The first control unit 310 controls an operation of PC 300. The first control unit 310 includes a processor 311 and a memory 312. The processor 311 is configured with a CPU, a microcomputer, and the like, and is configured to execute a program to control each unit of the PC 300 in cooperation of software and hardware. The processor 311 may be programmed hardware such as a DSP, and an FPGA.

The memory 312 is configured with a RAM for forming a work area of the processor 311, a ROM for storing a control program, and the like. Further, the control unit 310 may be a semiconductor device integrating the processor 311 and the memory 312. CPU is an abbreviation for a "Central Processing Unit", RAM is an abbreviation for a "Random Access Memory", and ROM is an abbreviation for a "Read Only Memory".

The first control unit 310 includes a marker detection unit 321, an identification unit 322, a guide image generation unit 323, a state image generation unit 324, a first data storage unit 325, and a second data storage unit 326.

Specifically, the processor 311 included in the first control unit 310 functions as the marker detection unit 321, the identification unit 322, the guide image generation unit 323, and the state image generation unit 324 by executing a control program in the memory 312. The processor 311 makes the memory 312 function as the first data storage unit 325 and the second data storage unit 326.

The first data storage unit 325 stores offline data. The offline data is generated without using the machine body of the robot 500, and indicates the data for instructing an operation of the robot 500.

The second data storage unit 326 stores teaching data. The teaching data indicates data for modifying the offline data by using the machine body of the robot 500.

The first control unit 310 receives the teaching data from the controller 400 and stores the teaching data in the second data storage unit 326.

The marker detection unit 321 detects an image marker provided on a shaft member of the robot 500 from a captured image. The captured image indicates an image captured by the camera 61. The captured image includes an image of the robot 500. The shaft member includes the first shaft member AX1 and the eighth shaft member AX8, for example.

The image marker is a two-dimensional marker, for example. The image marker is adhered to the shaft member. Specifically, the image marker is adhered to the circumference of the shaft member. The image marker indicates a name of the shaft member and a direction of the shaft member. The name of the shaft member refers to which of the first shaft member AX1 to the eighth shaft member AX8 is the shaft member. The direction of the shaft member refers to a direction of a main shaft of the shaft member. The image marker will be described below with reference to FIG. 4.

The identification unit 322 identifies a position and a direction of the shaft member from the HMD 100 based on the captured image. The shaft member includes the first shaft member AX1 and the eighth shaft member AX8, for example. In other words, the identification unit 322 identifies a position and a direction of the first shaft member AX1 from the HMD 100 based on the captured image. In addition, the identification unit 322 identifies a position and a direction of the eighth shaft member AX8 from the HMD 100 based on the captured image.

More specifically, the identification unit 322 identifies the position and the direction of the first shaft member AX1 from the HMD 100 and the position and the direction of the eighth shaft member AX8 from the HMD 100 based on detection results of the image markers by the marker detection unit 321. The image marker is, for example, a two-dimensional marker.

The guide image generation unit 323 generates the guide image P1 corresponding to the position and the direction of the first shaft member AX1 identified by the identification unit 322, and causes the guide image P1 to be displayed on the HMD 100 such that the guide image P1 overlaps with a scene in a real space. The scene in the real space includes a scene including the robot 500 placed in the real space. Specifically, the guide image generation unit 323 causes the guide image P1 to be displayed on the HMD 100 such that the guide image P1 corresponds to the robot 500.

More specifically, since the HMD 100 is a see-through type display device, imaging light representing the guide image P1 guided by the right light-guiding plate 26 and outside light transmitted through the right light-guiding plate 26 are incident on the right eye of a user. Similarly, imaging light representing the guide image P1 guided by the left light-guiding plate 28 and outside light transmitted through the left light-guiding plate 28 are incident on the left eye of the user. As described above, the HMD 100 allows the imaging light corresponding to the guide image P1 and the outside light to be incident on the eyes of the user in an overlapped manner, and the user can see an external scene through the right light-guiding plate 26 and the left light-guiding plate 28, and can visually recognize the image based on the imaging light representing the guide image P1 in a state of overlapping with the external scene. The external scene corresponds to the "scene in the real space".

In addition, the guide image generation unit 323 makes the HMD 100 update display of the guide image P1 in response to the operation of the robot 500.

In addition, the guide image generation unit 323 generates the region guide image P3 for guiding the region where the robot 500 moves, and causes the region guide image P3 to be displayed on the HMD 100 in a state of overlapping with the scene in the real space. The guide image generation unit 323 causes the region guide image P3 to be displayed on the HMD 100 such that the region guide image P3 corresponds to the robot 500. Specifically, the region guide image P3 is displayed on the HMD 100 in the same manner as the guide image P1.

The guide image P1 will be further described below with reference to FIG. 5 and FIG. 6. The region guide image P3 will be further described below with reference to FIG. 7.

The state image generation unit 324 acquires, from the second control unit 410, status information indicating a state of the robot 500. The state image generation unit 324 generates the status image P2 indicating the state of the robot 500, and causes the status image P2 to be displayed on the HMD 100 in the state of overlapping with the scene in the real space. The state image generation unit 324 causes the status image P2 to be displayed on the HMD 100 such that the status image P2 corresponds to the robot 500. Specifically, the status image P2 is displayed on the HMD 100 in the same manner as the guide image P1.

The status image P2 will be further described below with reference to FIG. 5 and FIG. 6.

In the exemplary embodiment, the identification unit 322 identifies, but is not limited to, the position and the direction of the first shaft member AX1 from the HMD 100 and the position and the direction of the eighth shaft member AX8 from the HMD 100 based on the detection results of the image markers by the marker detection unit 321. Based on a line of sight of the user wearing the HMD 100, the identification unit 322 may identify one image marker of the image markers individually provided on the tool 51 and the first shaft member AX1 to the eighth shaft member AX8. In this case, the guide image generation unit 323 displays the guide image P1 corresponding to the one image marker identified by the identification unit 322. In this case, the guide image P1 that the user desires to display can be easily displayed. Accordingly, user convenience can be further enhanced.

Note that the line of sight of the user may be detected by, for example, a line-of-sight sensor mounted on the HMD 100. The line-of-sight sensor detects the line of sight, for example, based on an image generated by capturing both eyes of the user wearing the HMD 100.

The controller 400 includes the second control unit 410.

The second control unit 410 controls an operation of the controller 400. The second control unit 410 includes a processor 411 and a memory 412. The processor 411 is configured with a CPU, a microcomputer, and the like, and is configured to execute a program to control each unit of the controller 400 in cooperation of software and hardware. The processor 411 may be programmed hardware such as a DSP, and an FPGA.

The memory 412 is configured with a RAM for forming a work area of the processor 411, a ROM for storing a control program, and the like. Further, the control unit 410 may be a semiconductor device integrating the processor 411 and the memory 412.

The second control unit 410 includes an input unit 421 and an operation instruction unit 422.

Specifically, the processor 411 of the second control unit 410 functions as the input unit 421 and the operation instruction unit 422 by executing the control program in the memory 412.

The input unit 421 accepts an input regarding an operation of the robot 500. Specifically, the input unit 421 accepts an input regarding an operation of the tool 51 of the robot 500. For example, the input unit 421 accepts an input indicating that the tool 51 of the robot 500 is moved 5 mm in an X-axis direction of local coordinates of the tool 51.

The operation instruction unit 422 allows the robot 500 to operate based on the input accepted by the input unit 421. Specifically, the input unit 421 accepts the input regarding the operation of the tool 51 of the robot 500, and the operation instruction unit 422 determines the operation of the entire robot 500 to achieve the operation of the tool 51 and instructs the robot 500 to perform the determined operation. Specifically, the operation instruction unit 422 determines operations of the first joint 52 to the eighth joint 59 of the robot 500 to achieve the operation of the tool 51 and instructs the robot 500 to operate.

In addition, the user determines whether the robot 500 is operating properly. Then, when the user determines that the operation of the robot 500 is proper, the user inputs, to the input unit 421, an instruction for transmission of the determined operations as teaching data to the PC 300. Then, the operation instruction unit 422 transmits data indicating the operation of the entire robot 500 as the teaching data to the PC 300. The PC 300 stores the teaching data in the second data storage unit 326.

Figure 4:
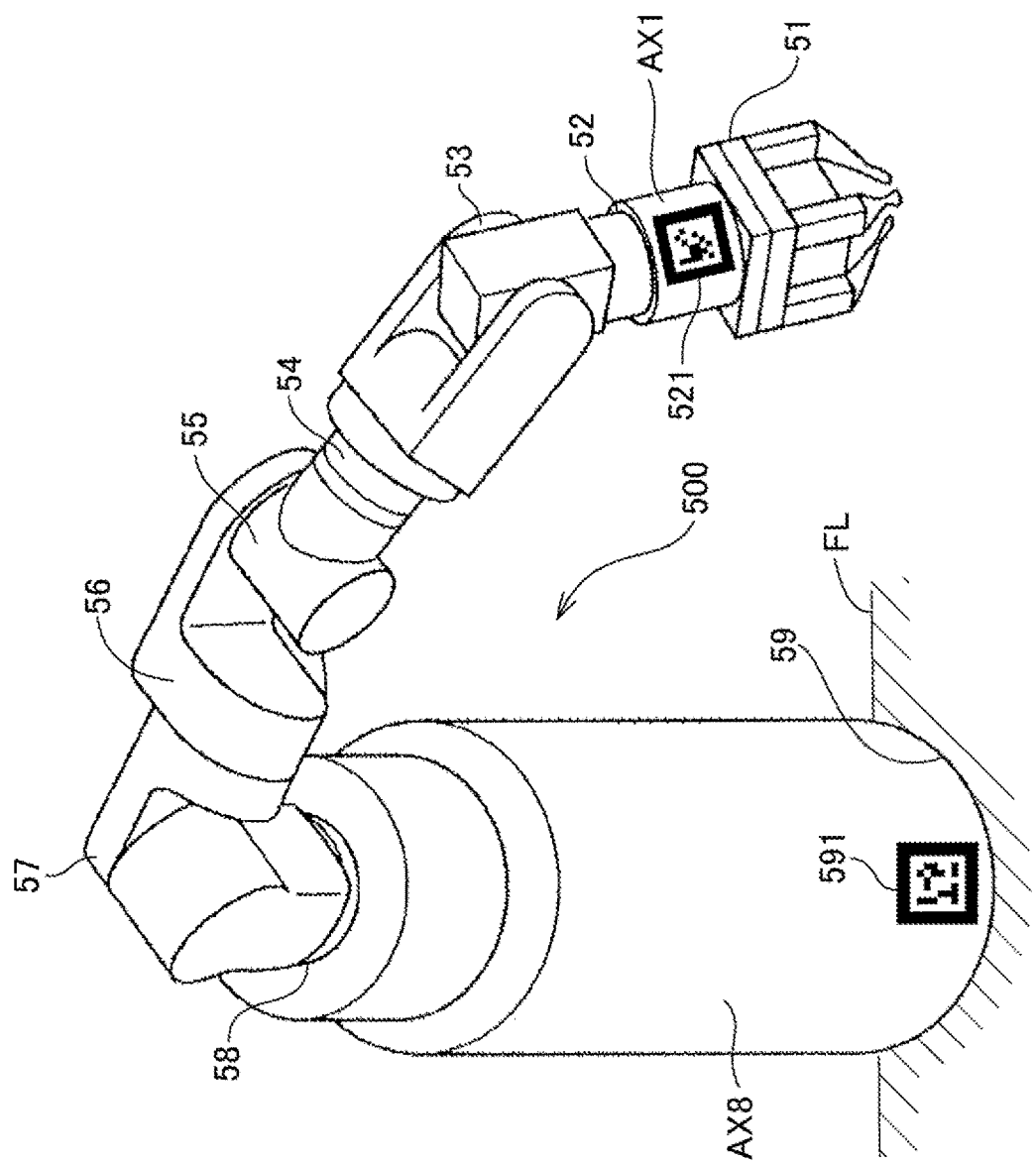
FIG. 4 is a diagram illustrating a two-dimensional marker.

Next, two-dimensional markers will be described with reference to FIG. 1 to FIG. 4. FIG. 4 is a diagram illustrating a two-dimensional marker 521 and a two-dimensional marker 591. The two-dimensional marker 521 and the two-dimensional marker 591 correspond to examples of the "image marker".

As illustrated in FIG. 4, the two-dimensional marker 521 is adhered to the circumference of the first shaft member AX1. The two-dimensional marker 521 indicates that the shaft member to which the two-dimensional marker 521 has been adhered is the first shaft member AX1, and indicates a direction parallel to an axis of the first shaft member AX1.

For example, when the two-dimensional marker 521 is formed in a rectangular shape, one side of the two-dimensional marker 521 indicates the direction parallel to the axis of the first shaft member AX1. Further, the other side of the two-dimensional marker 521 indicates a direction orthogonal to the axis of the first shaft member AX1.

An image representing a two-dimensional bar code is formed on the two-dimensional marker 521. The two-dimensional bar code formed on the two-dimensional marker 521 indicates that the shaft member to which the two-dimensional marker 521 is adhered is the first shaft member AX1, and indicates the direction parallel to the axis of the first shaft member AX1.

The two-dimensional marker 591 is adhered to the circumference of the eighth shaft member AX8. The two-dimensional marker 591 indicates that the shaft member to which the two-dimensional marker 591 has been adhered is the eighth shaft member AX8, and indicates a direction parallel to an axis of the eighth shaft member AX8.

For example, when the two-dimensional marker 591 is formed in a rectangular shape, one side of the two-dimensional marker 591 indicates the direction parallel to the axis of the eighth shaft member AX8. Further, the other side of the two-dimensional marker 591 indicates a direction orthogonal to the axis of the eighth shaft member AX8.

An image representing a two-dimensional bar code is formed on the two-dimensional marker 591. The two-dimensional bar code formed on the two-dimensional marker 591 indicates that the shaft member to which the two-dimensional marker 591 has been adhered is the eighth shaft member AX8, and indicates the direction parallel to the axis of the eighth shaft member AX8.

The marker detection unit 321 detects, from the captured image, the two-dimensional marker 521 adhered to the first shaft member AX1 of the robot 500. The identification unit 322 identifies the position and the direction of the first shaft member AX1 from the HMD 100 based on a detection result of the two-dimensional marker 521 by the marker detection unit 321.

Specifically, the identification unit 322 identifies the direction of the first shaft member AX1 based on the image formed on the two-dimensional marker 521. Furthermore, the identification unit 322 detects a distance and the direction of the two-dimensional marker 521 from the HMD 100, from the captured image, and identifies the position of the first shaft member AX1.

The marker detection unit 321 detects, from the captured image, the two-dimensional marker 591 adhered to the eighth shaft member AX8 of the robot 500. The identification unit 322 identifies the position and the direction of the eighth shaft member AX8 from the HMD 100 based on a detection result of the two-dimensional marker 591 by the marker detection unit 321.

Specifically, the identification unit 322 identifies the direction of the eighth shaft member AX8 based on the image formed on the two-dimensional marker 591. Furthermore, the identification unit 322 detects a distance and the direction of the two-dimensional marker 591 from the HMD 100, from the captured image, and identifies the position of the eighth shaft member AX8.

In the exemplary embodiment of the present disclosure, a two-dimensional marker is adhered to each of the first shaft member AX1 and the eighth shaft member AX8, but the present disclosure is not limited thereto. A two-dimensional marker may be adhered to at least one of the tool 51, and the first shaft member AX1 to the eighth shaft member AX8. Two-dimensional markers are preferably adhered to a plurality of locations of the tool 51, and the first shaft member AX1 to the eighth shaft member AX8.

In the exemplary embodiment of the present disclosure, the image marker is the two-dimensional marker in which an image representing a two-dimensional bar code has been formed, but the present disclosure is not limited thereto. The image marker may be a marker in which an image has been formed. For example, the image may be a one-dimensional bar code. Also, for example, the image may be an image representing a symbol. Here, examples of the symbol include characters, numbers, mathematical symbols, and graphic symbols. Examples of the characters include alphabet, katakana, hiragana, and Chinese characters.

Next, the guide image P1 and the status image P2 will be described with reference to FIG. 1 to FIG. 5. FIG. 5 is a diagram illustrating an example of the guide image P1 and the status image P2.

Figure 5:
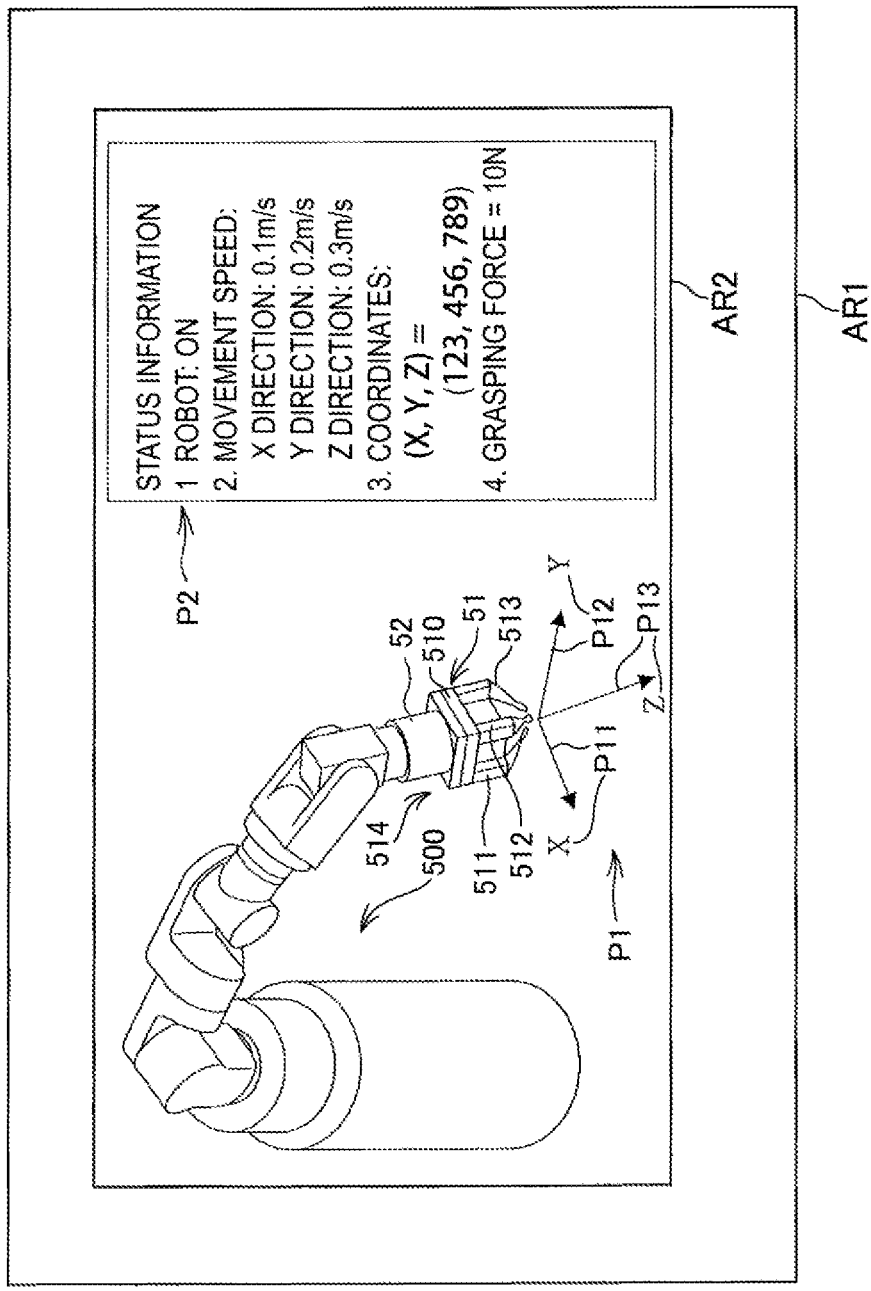
FIG. 5 is a diagram illustrating an example of a guide image and a state image.

In FIG. 5, a visual field region AR1 and an image region AR2 are illustrated. The visual field region AR1 indicates a range of the scene in the real space that is recognizable by the user by the outside light transmitted through the right light-guiding plate 26 and the outside light transmitted through the left light-guiding plate 28 illustrated in FIG. 1. In other words, the visual field region AR1 indicates a range of the visual field of the user wearing the HMD 100. The visual field region AR1 includes the robot 500.

The image region AR2 indicates a range of the image that is recognizable by the user by the image light guided by the right light-guiding plate 26 and the image light guided by the left light-guiding plate 28 illustrated in FIG. 1. In other words, the image region AR2 indicates a range of the image that is recognizable by the user wearing the HMD 100. The guide image P1 and the status image P2 are displayed on the image region AR2.

The image region AR2 is included in the visual field region AR1.

The guide image P1 is arranged at a position corresponding to the robot 500 included in the scene in the real space. Specifically, the guide image P1 is arranged in the vicinity of a tip end position of the tool 51 of the robot 500 included in the scene in the real space.

The guide image P1 indicates the tool coordinate system TC corresponding to the direction of the tool 51. The tool coordinate system TC is set in a direction based on the tool 51.

The tool coordinate system TC includes an X-axis, a Y-axis, and a Z-axis. That is, the guide image P1 includes an X-axis image P11, a Y-axis image P12, and a Z-axis image P13. The X-axis image P11 indicates the X-axis. The Y-axis image P12 indicates the Y-axis. The Z-axis image P13 indicates the Z-axis.

The X axis, the Y axis, and the Z axis are mutually orthogonal. The Z-axis indicates a direction parallel to the direction of the axis of the first shaft member AX1. Additionally, the positive direction of the Z-axis indicates a direction from a base end to a tip end of the tool 51.

The tool 51 includes a finger 511, a finger 512, a finer 513, and a finger 514. The finger 511 to the finger 514 grasps a target object. The tool 51 also includes a base end portion 510. The base end portion 510 is formed in a rectangular plate shape. A base end of the finger 511 and a base end of the finger 512 are disposed along a first side of the base end portion 510 of the tool 51. A base end of the finger 512 and a base end of the finger 513 are disposed along a second side of the base end portion 510 of the tool 51. The first side and the second side indicate sides adjacent to each other.

The Y-axis indicates a direction in which the base end of the finger 511 and the base end of the finger 512 are disposed. In other words, the Y-axis indicates a direction parallel to the first side. The positive direction of the Y-axis indicates a direction in which the base end of the finger 512 is positioned from the base end of the finger 511.

The X-axis indicates a direction in which the base end of the finger 512 and the base end of the finger 513 are disposed. In other words, the X-axis indicates a direction parallel to the second side. The positive direction of the X-axis indicates a direction in which the base end of the finger 512 is positioned from the base end of the finger 513.

When the operation instruction unit 422 allows the robot 500 to operate, the guide image P1 is moved along with movement of the tip end position of the tool 51 of the robot 500 included in the scene in the real space.

In other words, the first control unit 310 illustrated in FIG. 3 makes the HMD 100 update the display of the guide image P1 in response to the operation of the robot 500. Specifically, each time the tip end position of the tool 51 of the robot 500 included in the scene in the real space moves, the following processes are repeatedly executed. In other words, first, the marker detection unit 321 detects the two-dimensional marker 521 provided on the first shaft member AX1 of the robot 500 from the captured image captured by the camera 61. Then, the identification unit 322 identifies the position and the direction of the first shaft member AX1 from the HMD 100 based on the detection result of the two-dimensional marker 521 by the marker detection unit 321. Next, the guide image generation unit 323 generates the guide image P1 corresponding to the position and the direction of the first shaft member AX1 identified by the identification unit 322. The guide image generation unit 323 causes the guide image P1 to be displayed, in the vicinity of the tip end position of the tool 51 of the robot 500 disposed in the real space, on the HMD 100.

The status image P2 is arranged at a position corresponding to the robot 500 included in the scene in the real space. Specifically, the status image P2 is displayed on a right side of the robot 500 included in the scene in the real space. The status image P2 indicates an operating state of the robot 500, movement speed of the tip end of the tool 51, coordinates indicating a position of the tip end of the tool 51, and a value of grasping force of the tool 51.

The operating state of the robot 500 indicates whether the robot 500 is in an ON state in which the robot 500 is operating, or in an OFF state in which the robot 500 is not operating, or whether the robot 500 is in a suspend state.

The movement speed of the tip end of the tool 51 indicates the movement speed of the tip end of the tool 51 in the X-axis direction, the movement speed of the tip end of the tool 51 in the Y-axis direction, and the movement speed of the tip end of the tool 51 in the Z-axis direction. Here, the X-axis, the Y-axis, and the Z-axis configure a reference coordinate system AC of the robot 500. The reference coordinate system AC of the robot 500 is set based on the eighth shaft member AX8 disposed on the floor FL.

For example, the positive direction of the Z-axis indicates a direction from the base end to the tip end of the eighth shaft member AX8. The X-axis and the Y-axis indicate the direction orthogonal to the Z-axis. The direction of the X-axis and the direction of the Y-axis are defined based on the floor FL on which the eighth joint 59 is disposed, for example.

When the floor FL has, for example, a rectangular shape, the direction of the X-axis is defined as a direction parallel to a long side direction of the floor FL, and the direction of the Y-axis is defined as a direction parallel to a short side direction of the floor FL.

Coordinates indicating the position of the tip end of the tool 51 also indicate coordinates in the reference coordinate system AC of the robot 500.

The value of the grasping force of the tool 51 indicates a value detected by the sensor S illustrated in FIG. 1.

Note that in the exemplary embodiment of the present disclosure, the guide image P1 indicates the tool coordinate system TC, but the present disclosure is not limited thereto. The guide image P1 may indicate a coordinate system corresponding to the direction of at least one of the first shaft member AX1 to the eighth shaft member AX8. For example, the guide image P1 may have a form indicating the tool coordinate system TC and a coordinate system corresponding to the direction of the eighth shaft member AX8.

Additionally, in the exemplary embodiment of the present disclosure, the guide image P1 is arranged in the vicinity of the tip end position of the tool 51 of the robot 500 included in the scene in the real space, but the present disclosure is not limited thereto. The guide image P1 may be arranged at a position corresponding to the robot 500 included in the scene in the real space. For example, the guide image P1 may be arranged above the robot 500 included in the scene in the real space.

Also, in the exemplary embodiment of the present disclosure, the status image P2 is displayed on the right side of the robot 500 included in the scene in the real space, but the present disclosure is not limited thereto. The status image P2 may be arranged at a position corresponding to the robot 500 included in the scene in the real space. For example, the status image P2 may be arranged on the left side of the robot 500 included in the scene in the real space.

Additionally, in the exemplary embodiment of the present disclosure, the guide image P1 corresponds to the position and the direction of the first shaft member AX1, but the present disclosure is not limited thereto. Depending on a posture, a moving state, or the like of the user wearing and using the HMD 100, for example, the guide image P1 corresponding to the position and the direction of the shaft member disposed on the floor FL may be displayed.

Specifically, when the user wearing and using the HMD 100 is moving, and when a head of the user wearing and using the HMD 100 is inclined, the guide image P1 corresponding to the eighth shaft member AX8 may be displayed.

Figure 6:
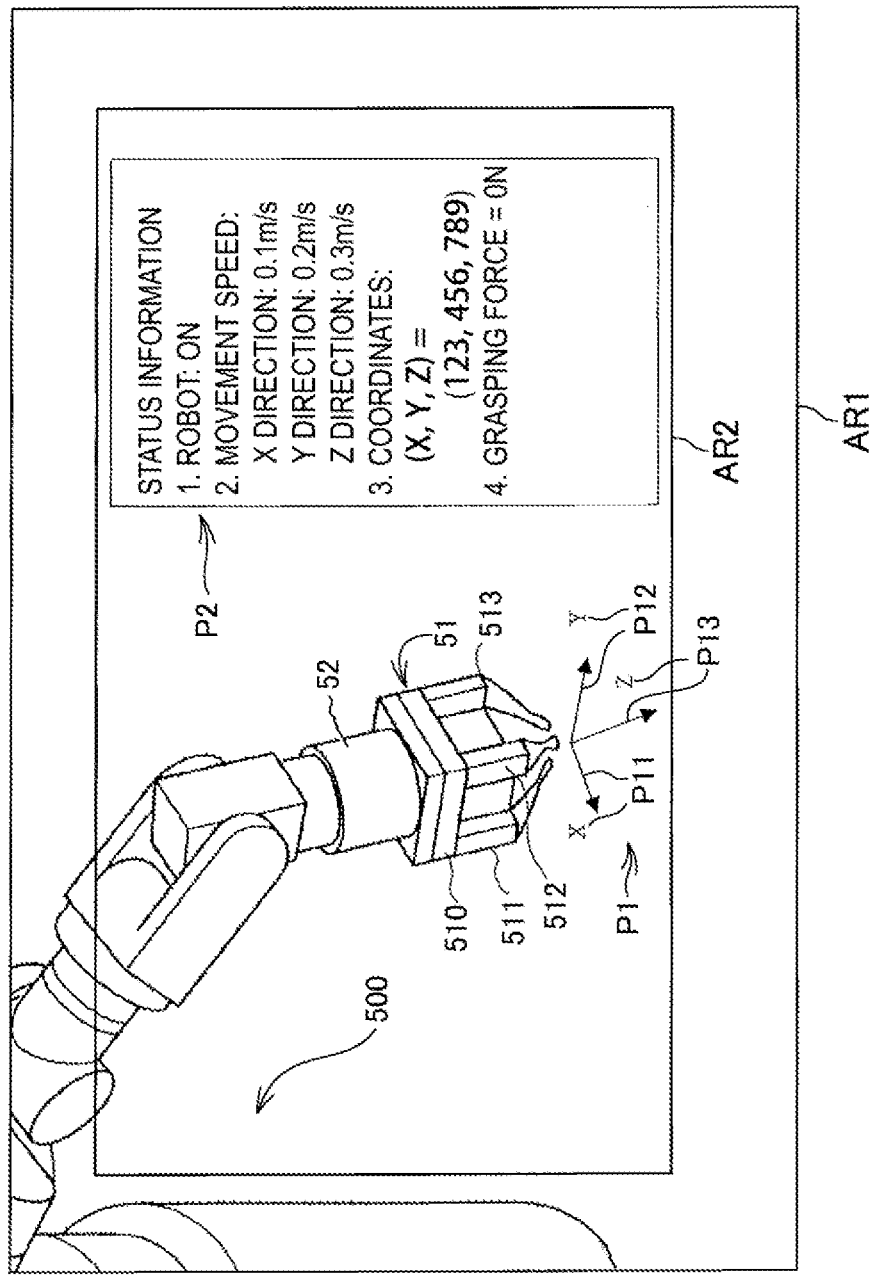
FIG. 6 is a diagram illustrating another example of the guide image and the state image.

Next, with reference to the FIG. 1 to FIG. 6, the guide image P1 and the status image P2 will be further described. FIG. 6 is a diagram illustrating another example of the guide image P1 and the status image P2.

In FIG. 6, similarly to FIG. 5, the visual field region AR1 and the image field AR2 are illustrated. In addition, in FIG. 6, similarly to FIG. 5, the guide image P1 and the status image P2 are displayed.

As illustrated in FIG. 6, FIG. 6 is different from FIG. 5 in that the tool 51 of the robot 500 included in the scene in the real space is enlarged and illustrated in the visual field region AR1, compared with the tool 51 of the robot 500 illustrated in FIG. 5. In other words, in FIG. 6, a distance LR1 between the HMD 100 and the tool 51 of the robot 500 is shorter than a distance LR2 between the HMD 100 and the tool 51 of the robot 500 in FIG. 5.

The guide image generation unit 323 illustrated in FIG. 3 determines a size of the guide image P1 in response to a distance LR between the HMD 100 and the tool 51 of the robot 500. For example, as the distance LR between the HMD 100 and the tool 51 of the robot 500 becomes shorter, the guide image generation unit 323 makes the size of the guide image P1 smaller.

That is, because the distance LR1 is shorter than the distance LR2, the guide image generation unit 323 makes the size of the guide image P1 smaller than the size of the guide image P1 illustrated in FIG. 5.

Accordingly, the size of the guide image P1 illustrated in FIG. 6 is smaller than the size of the guide image P1 illustrated in FIG. 5.

Note that, in the exemplary embodiment of the present disclosure, as the distance LR between the HMD 100 and the tool 51 of the robot 500 is shorter, the guide image generation unit 323 makes the size of the guide image P1 smaller, but the present disclosure is not limited thereto. It is sufficient that the guide image generation unit 323 determine the size of the guide image P1 depending on the distance LR between the HMD 100 and the tool 51 of the robot 500. For example, as the distance LR between the HMD 100 and the tool 51 becomes shorter, the guide image generation unit 323 may make a size of the Z-axis image P13 included in the guide image P1 smaller, and may not change a size of the X-axis image P11 and a size of the Y-axis image P12.

Figure 7:
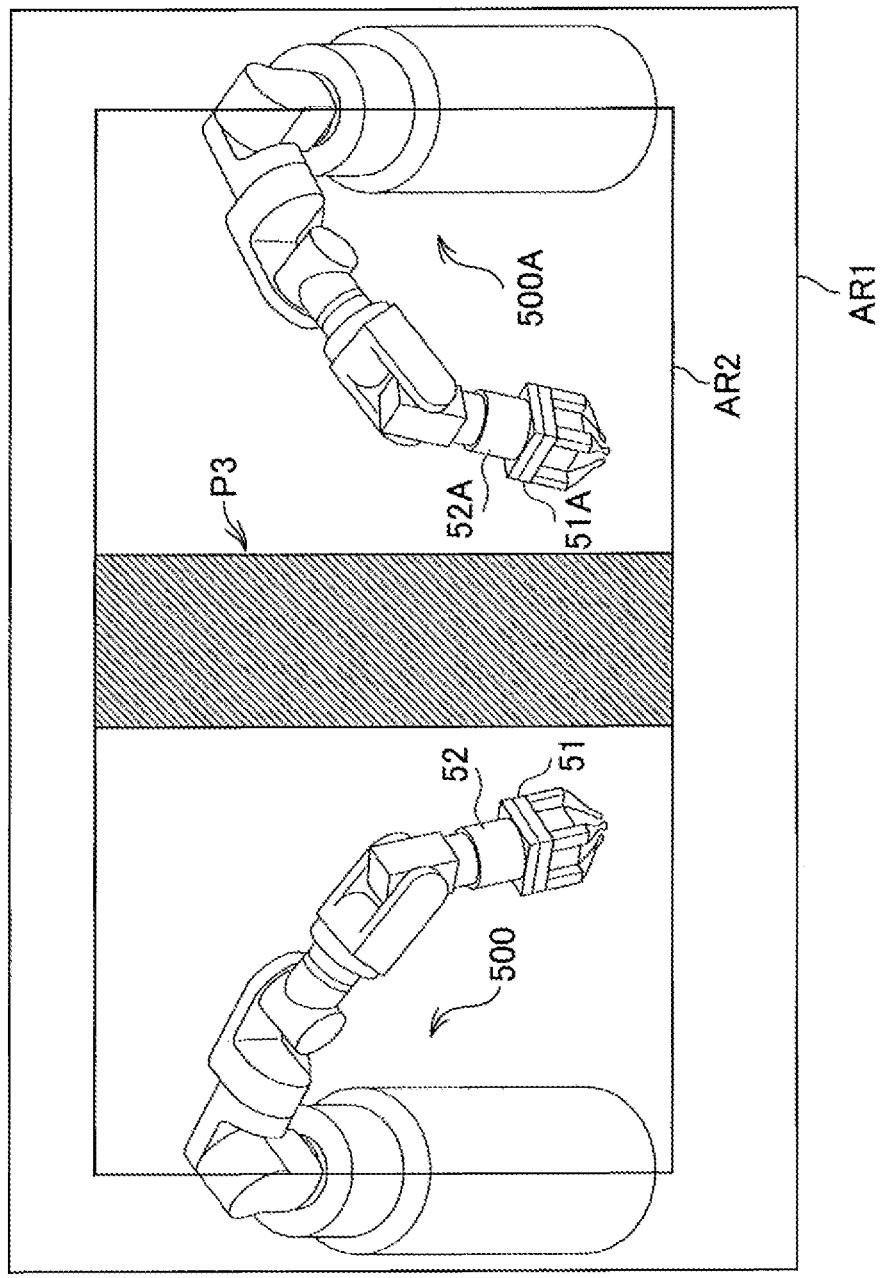
FIG. 7 is a diagram illustrating an example of a region guide image.

Next, the region guide image P3 will be described with reference to FIG. 1 to FIG. 7. FIG. 7 is a diagram illustrating an example of the region guide image P3.

As illustrated in FIG. 7, the visual field region AR1 and the image region AR2 are illustrated. Moreover, in the visual field region AR1, the robot 500 and a robot 500A are included in the scene in the real space. In other words, the robot 500 and the robot 500A are disposed in the real space.

In addition, as illustrated in FIG. 7, the region guide image P3 is displayed in the image region AR2. The region guide image P3 is displayed between the robot 500 and the robot 500A.

The region guide image P3 is for guiding a region where each of the robot 500 and the robot 500A moves. Specifically, each of the robot 500 and the robot 500A is prevented from entering a region indicated by the region guide image P3. The region indicated by the region guide image P3 may be described below as a prohibited region.

The operation instruction unit 422 illustrated in FIG. 3 allows the robot 500 and the robot 500A to operate based on the input accepted by the input unit 421. For example, when the robot 500 operates and the robot 500 enters the region indicated by the region guide image P3, the robot 500 and the robot 500A may possibly interfere with each other, so the operation of the robot 500 is prohibited.

Specifically, when the robot 500 enters the region indicated by the region guide image P3, the first control unit 310 notifies the user that the robot 500 has entered the prohibited region.

More specifically, when the robot 500 enters the region indicated by the region guide image P3, the first control unit 310 allows sound indicating that the robot 500 has entered the prohibited region to be output to the right earphone 32 and the left earphone 34. When the robot 500 enters the region indicated by the region guide image P3, the first control unit 310 changes a display form of the region guide image P3. For example, the region guide image P3 is flashed and displayed. Additionally, for example, a display color of the region guide image P3 is changed.

Note that in the exemplary embodiment of the present disclosure, when the robot 500 enters the region indicated by the region guide image P3, the first control unit 310 notifies the user that the robot 500 has entered the prohibited region, but the present disclosure is not limited thereto. When the robot 500 enters the region indicated by the region guide image P3, the first control unit 310 may prohibit input to the input unit 421. In this case, the robot 500 can be reliably prevented from entering the prohibited region.

In the exemplary embodiment of the present disclosure, the robot 500 and the robot 500A are disposed in the real space, but the present disclosure is not limited thereto. Only the robot 500 may be disposed in the real space. In this case, when the robot 500 operates and the robot 500 enters the region indicated by the region guide image P3, the robot 500 is prevented from operating because the robot 500 and an operator may possibly interfere with each other, for example.

Figure 8:
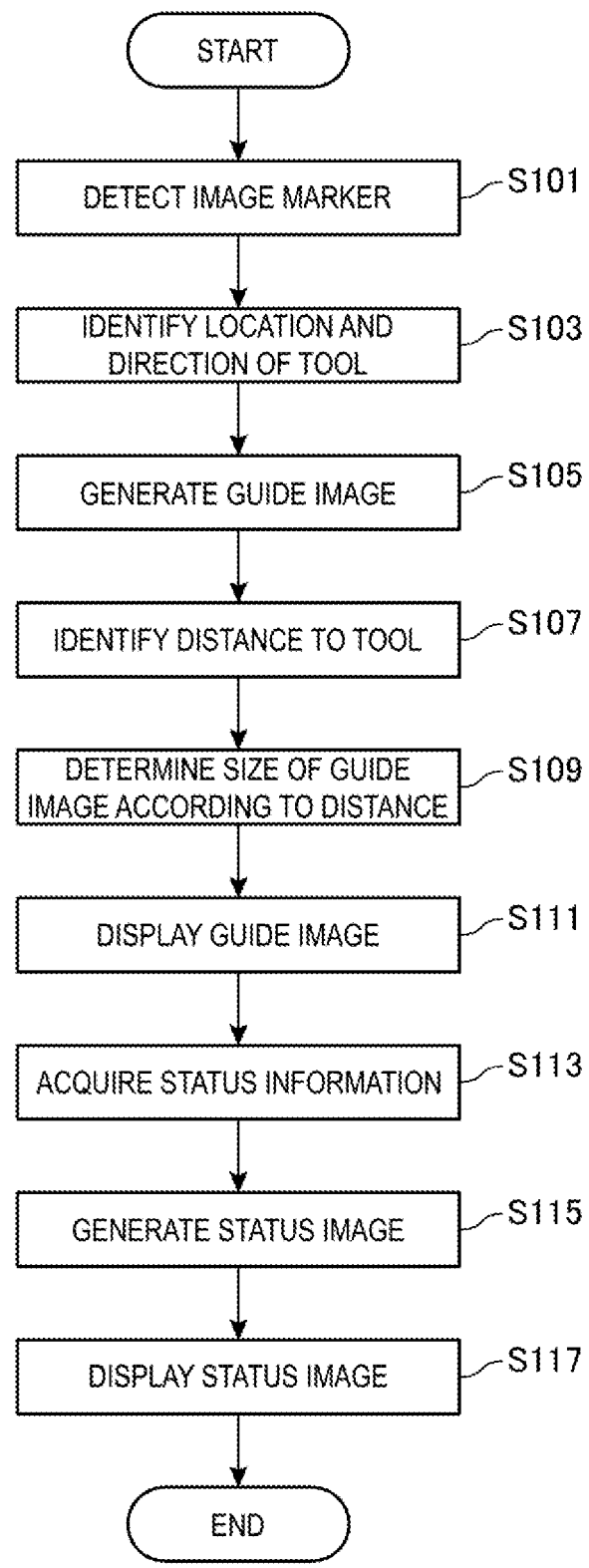
FIG. 8 is a flowchart illustrating processing of the first control unit.

Next, processing of the first control unit 310 will be described with reference to FIG. 1 to FIG. 8. FIG. 8 is a flowchart indicating the processing of the first control unit 310.

As illustrated in FIG. 8, in step S101, the marker detection unit 321 detects the image marker provided on the shaft member of the robot 500 from the captured image captured by the camera 61. Specifically, the marker detection unit 321 detects the two-dimensional marker 521 provided on the first shaft member AX1 illustrated in FIG. 4.

Next, in step S103, the identification unit 322 identifies the position and the direction of the shaft member from the HMD 100 based on the captured image. Specifically, the identification unit 322 identifies the position and the direction of the first shaft member AX1 from the HMD 100 based on the detection result of the two-dimensional marker 521 by the marker detection unit 321. In the exemplary embodiment of the present disclosure, the tool 51 and the first shaft member AX1 are integrally formed. In other words, the identification unit 322 identifies the position and the direction of the tool 51 from the HMD 100 based on the detection result of the two-dimensional marker 521 by the marker detection unit 321.

Next, in step S105, the guide image generation unit 323 generates the guide image P1 corresponding to the position and the direction of the first shaft member AX1 identified by the identification unit 322.

Next, in step S107, the guide image generation unit 323 identifies the distance LR between the HMD 100 and the tool 51 of the robot 500.

Then, in step S109, the guide image generation unit 323 determines the size of the guide image P1 in response to the distance LR.

Next, in step S111, the guide image generation unit 323 causes the guide image P1 to be displayed on the HMD 100 such that the guide image P1 corresponds to the robot 500 disposed in the real space. Specifically, the guide image generation unit 323 causes the guide image P1 to be displayed in the vicinity of the tip end position of the tool 51 of the robot 500 disposed in the real space.

Next, in step S113, the state image generation unit 324 acquires the status information indicating the state of the robot 500 from the second control unit 410.

Then, in step S115, the state image generation unit 324 generates the status image P2 indicating the state of the robot 500.

Next, in step S117, the state image generation unit 324 causes the status image P2 to be displayed on the HMD 100 such that the status image P2 corresponds to the robot 500 disposed in the real space. Specifically, the state image generation unit 324 causes the status image P2 to be displayed on the right side of the robot 500 disposed in the real space. Then, the processing is terminated.

Note that step S111 corresponds to an example of the "display step".

Figure 9:
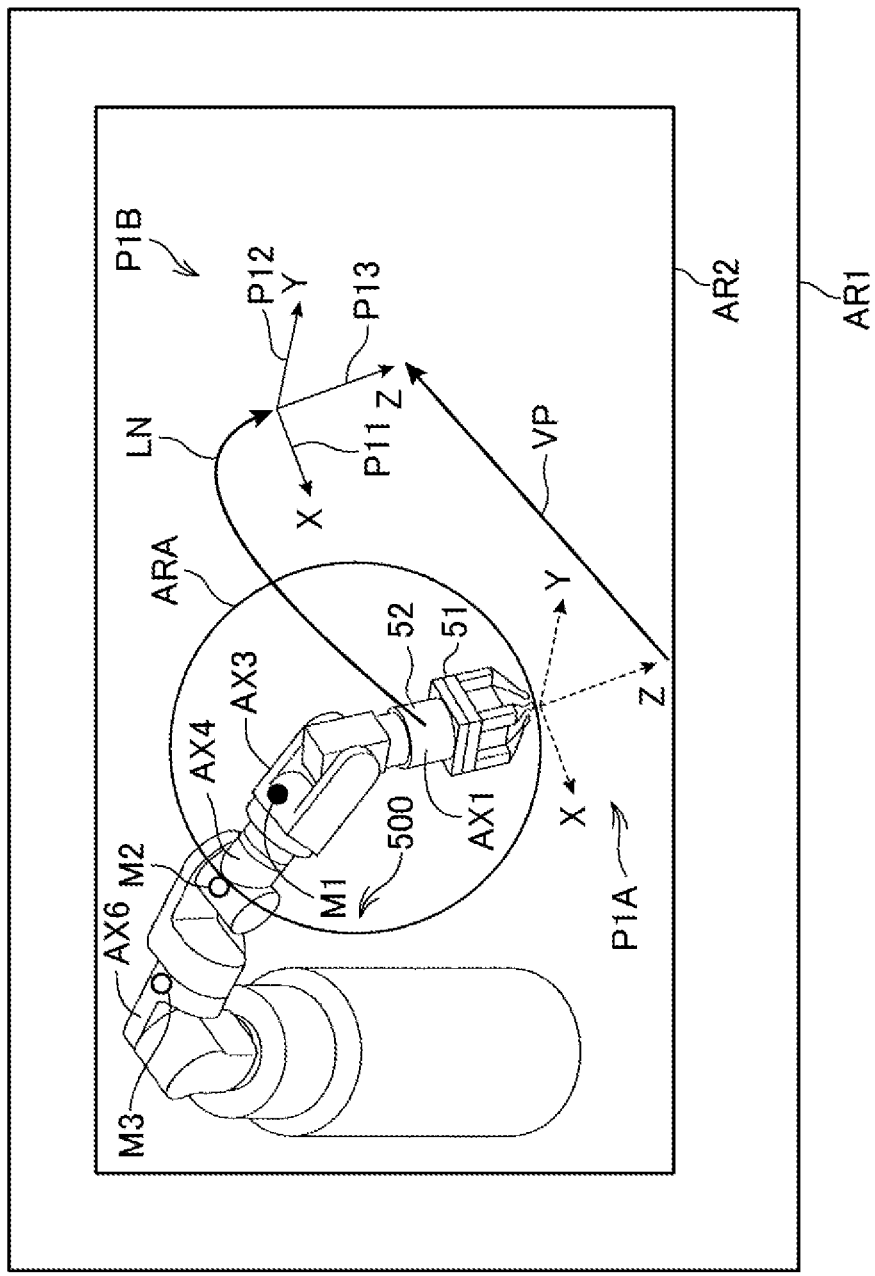
FIG. 9 is a diagram illustrating yet another example of the guide image.

FIG. 9 is a diagram illustrating still another example of the guide image P1.

In FIG. 9, similarly to the FIG. 5, the visual field region AR1 and the image region AR2 are illustrated.

Also, as illustrated in FIG. 9, the guide image P1 indicates the tool coordinate system TC corresponding to the direction of the tool 51. The tool coordinate system TC is set in a direction based on the tool 51.

The tool coordinate system TC includes the X-axis, the Y-axis, and the Z-axis. That is, the guide image P1 includes the X-axis image P11, the Y-axis image P12, and the Z-axis image P13. The X-axis image P11 indicates the X-axis. The Y-axis image P12 indicates the Y-axis. The Z-axis image P13 indicates the Z-axis.

In FIG. 5, the guide image P1 is arranged in the vicinity of the tip end position of the tool 51 of the robot 500 included in the scene in the real space, while in FIG. 9, the guide image P1 is configured such that the position in which the guide image P1 is arranged can be changed based on a user operation.

For example, as illustrated in FIG. 9, the guide image P1 is moved from the position indicated by the dashed line to the position indicated by the solid line based on a user operation. A guide image P1A indicates the guide image P1 in the position indicated by the dashed line. A guide image P1B indicates the guide image P1 in the position indicated by the solid line.

A direction VP indicates a moving direction of the guide image P1 by the user operation. That is, the guide image P1A is moved in the direction VP by the user operation and the guide image P1B is displayed.

In addition, a combined image LN is displayed in FIG. 9. The combined image LN indicates that the guide image P1B corresponds to the tool coordinate system TC. Specifically, the combined image LN is an image that combines the guide image P1B and the tool 51 of the robot 500 included in the scene in the real space.

By displaying the combined image LN, the user can easily recognize that the guide image P1 indicates the tool coordinate system T corresponding to the direction of the tool 51 even when the guide image P1 is moved to a position desired by the user.

In FIG. 9, a fulcrum mark M and an image of a movable range ARA are displayed. The fulcrum mark M includes, for example, a fulcrum mark M1, a fulcrum mark M2, and a fulcrum mark M3.

The fulcrum mark M1, the fulcrum mark M2, and the fulcrum mark M3 are configured to be selectable by the user.

The fulcrum mark M1 is selected by the user when the movable range ARA with the third shaft member AX3 as a fulcrum is displayed.

The fulcrum mark M2 is selected by the user when the movable range ARA with the fourth shaft member AX4 as a fulcrum is displayed.

The fulcrum mark M3 is selected by the user when the movable range ARA with the sixth shaft member AX6 as a fulcrum is displayed.

In FIG. 9, the fulcrum mark M1 is selected. By illustrating each of the fulcrum mark M2 and the fulcrum mark M3 by a white circle, and illustrating the fulcrum mark M1 by a black circle, it is indicated that the fulcrum mark M1 is selected.

The movable range ARA indicates a range in which the tip end of the tool 51 is movable in a state in which the third shaft member AX3 corresponding to the fulcrum is fixed.

In addition, the movable range ARA may indicate a moving range of the tip end of the tool 51 without interference with other devices located around the robot 500 in the real space.

In this way, by displaying the movable range ARA, the teaching operation for the robot 500 can be easily performed.

Furthermore, by selecting a fulcrum mark desired by the user from the fulcrum mark M1, the fulcrum mark M2, and the fulcrum mark M3, the fulcrum for defining the movable range ARA can be selected. Thus, the teaching operation for the robot 500 can be more easily performed.

As described above, in the exemplary embodiment of the present disclosure, the HMD 100 displays an image overlapped with the scene in the real space. In addition, the first control unit 310 causes the guide image P1 indicating a direction from the robot 500 set as a reference to be displayed on the HMD 100 such that the guide image P1 corresponds to the robot 500 disposed in the real space. The tool coordinate system TC based on the tool 51 is set in the tool 51 of the robot 500. The first control unit 310 causes the guide image P1 indicating the tool coordinate system TC to be displayed corresponding to the direction of the tool 51.

Thus, the user can check a posture of the tool 51. Accordingly, the user convenience can be further enhanced.

Also, in the exemplary embodiment of the present disclosure, the robot 500 includes a motor capable of making at least one of movement and rotation of the tool 51 with respect to the HMD 100 possible. For example, the tool 51 is integrally formed with the first shaft member AX1 and the first shaft member AX1 is rotationally driven by the motor at the first joint 52.

Thus, because the tool 51 is rotationally driven by the motor at the first joint 52, the posture of the tool 51 changes. In addition, the user needs to recognize the posture when the user moves the tool 51. In addition, the guide image P1 indicating the tool coordinate system TC is displayed corresponding to the direction of the tool 51. Thus, the user can check the posture of the tool 51. Accordingly, convenience for the user can be further enhanced.

Furthermore, in the exemplary embodiment of the present disclosure, a plurality of shaft members and a coordinate system based on each of the shaft members are configured for the robot 500. The plurality of shaft members corresponds to the first shaft member AX1 to the eighth shaft member AX8. The first control unit 310 identifies a position and a direction of each of the shaft members, and causes the guide image P1 to be displayed corresponding to the position and the direction of each of the shaft members. For example, the first control unit 310 identifies the position and the direction of each of the first shaft member AX1 and the eighth shaft member AX8, and displays the guide image corresponding to the position and the direction of each of the first shaft member AX1 and the eighth shaft member AX8.

Thus, the user can check a posture of each of the shaft members. For example, the posture of the tool 51 and the position of the eighth shaft member AX8 can be checked by the user. Accordingly, convenience for the user can be further enhanced.

In the exemplary embodiment of the present disclosure, the HMD 100 includes the camera 61. The first control unit 310 identifies a position and a direction of the tool 51 from the HMD 100 based on the captured image by the camera 61, and causes the guide image P1 to be displayed corresponding to the position and the direction of the tool 51.

Thus, the appropriate guide image P1 can be displayed. Accordingly, convenience for the user can be further enhanced.

Further, in the exemplary embodiment of the present disclosure, the first control unit 310 detects the two-dimensional marker 521 provided on the first shaft member AX1 of the robot 500 from the captured image, thereby identifying the positions and the directions of the first shaft member AX1 and the tool 51 from the HMD 100.

Thus, with a simple configuration, the position and the direction of the tool 51 can be accurately identified.

Furthermore, in the exemplary embodiment of the present disclosure, a plurality of shaft members are configured for the robot 500. For example, the first shaft member AX1 and the eighth shaft member AX8 are configured. Moreover, the first control unit 310 detects the two-dimensional marker provided on each of the shaft members of the robot 500 from the captured image to identify the position and the direction of each of the shaft members from the HMD 100. For example, by detecting the two-dimensional marker 521 provided on the first shaft member AX1, the position and the direction of the first shaft member AX1 from the HMD 100 are identified. In addition, by detecting the two-dimensional marker 591 provided on the eighth shaft member AX8, the position and the direction of the eighth shaft member AX8 from the HMD 100 are identified.

Thus, with a simple configuration, the position and the direction of each of the plurality of shaft members can be accurately identified.

In the exemplary embodiment of the present disclosure, the first control unit 310 determines the size of the guide image P1 in response to the distance LR between the HMD 100 and the tool 51 of the robot 500.

Thus, the size of the guide image P1 can be determined to be an appropriate size. Thus, the posture of the tool 51 can be easily checked by the user. Accordingly, convenience for the user can be further enhanced.

In addition, in the exemplary embodiment of the present disclosure, the input unit 421 configured to accept an input related to the operation of the robot 500, and the operation instruction unit configured to cause the robot 500 to operate in response to the input. The first control unit 310 makes the HMD 100 update the display of the guide image P1 in response to the operation of the robot 500.

Thus, the guide image P1 can be displayed more appropriately. Accordingly, the user convenience can be further enhanced.

Additionally, in the exemplary embodiment of the present disclosure, the first control unit 310 causes the status image P2 indicating the state of the robot 500 to be displayed on the HMD 100 such that the status image P2 corresponds to the robot 500 installed in the real space. For example, the status image P2 is displayed on the right side of the robot 500.

Thus, the user can easily check the state of the robot 500. Accordingly, convenience for the user can be further enhanced.

Additionally, in the exemplary embodiment of the present disclosure, the first control unit 310 causes the region guide image P3 for guiding the region where the robot 500 moves to be displayed on the HMD 100 such that the guide image P3 corresponds to the robot 500 installed in the real space.

Thus, the user can easily check the region where the robot 500 moves. Accordingly, convenience for the user can be further enhanced.

The present disclosure is not limited to the configurations in the exemplary embodiment described above, and can be implemented in various aspects without departing from the gist of the disclosure.

For example, processing units in the flowchart illustrated in FIG. 8 are obtained by dividing the processing based on main processing contents in order to facilitate the understanding of the processing in the first control unit 310. The present disclosure is not limited by a way of dividing of the processing units, or their names illustrated in the flowchart in FIG. 8, the processing can be divided into more pieces of processing units based on the processing contents, and can be divided such that one processing unit includes more pieces of processing. An order of the processing in the above-described flowchart is also not limited to the illustrated example.

In the exemplary embodiment of the present disclosure, the robot 500 is disposed on the floor FL, but the present disclosure is not limited thereto. The robot 500 may be a moving type robot. However, even when the robot 500 is a moving type robot, the present disclosure is applied in a state in which the robot 500 is disposed on the floor FL or the like.

In the exemplary embodiment of the present disclosure, the robot 500 includes a single arm, but the present disclosure is not limited thereto. The robot 500 may include a plurality of arms.

In the exemplary embodiment of the present disclosure, the guide image generation unit 323 arranges the guide image P1 based on the position and the direction of the first shaft member AX1 identified by the identification unit 322, but the present disclosure is not limited thereto. The guide image generation unit 323 may arrange the guide image P1 according to any of the following aspects based on a detection result of the three-axis gyro sensor included in the six-axis sensor 235. Further, based on the detection result of the six-axis sensor 235, the guide image P1 may be displayed according to any of the following aspects.

In other words, in a first aspect, the guide image generation unit 323 fixes a display position of the guide image P1 based on the detection result of the three-axis gyro sensor.

In a second aspect, the guide image generation unit 323 corrects the display position of the guide image P1 based on the detection result of the three-axis gyro sensor.

In a third aspect, the guide image generation unit 323 performs image processing on the guide image P1 such that the guide image P1 corresponds to the robot 500. The image processing includes rotation processing, scaling processing, and color conversion processing.

Additionally, in the exemplary embodiment of the present disclosure, the image display unit 20 is configured to enable each of the right eye and the left eye of the user to visually recognize an image by the optical system included in the right display unit 22 and the left display unit 24. The present disclosure is not limited thereto, and, for example, may be configured to enable both the right eye and the left eye of the user to visually recognize an image by using a single optical member. Additionally, the HMD 100 may be a device configured to enable only either the right eye or the left eye of the user to visually recognize an image.

In the exemplary embodiment of the present disclosure described above, the connection device 10 includes the connectors 11B, 11C, and 11D, but the arrangement and the number of the connectors can be arbitrarily changed. The connection device 10 may include at least one connector to which an image is input and at least one connector to which power is supplied. For example, the connection device 10 may be configured to include only the connector 11B, or may be configured to include only the connectors 11C and 11D. Further, the connection device 10 may be configured such that three or more image signals can be input. For example, the connection device 10 may be configured to include two or three or more interface circuits and connectors having the same functions as the connectors 11B and 11A. Further, the connection device 10 may be configured to include two or three or more interface circuits and connectors having the same functions as the connectors 11C and 11B.

Instead of or in addition to the connectors 11B, and 11C, the connection device 10 may include a wireless communication unit.

Furthermore, the image display unit 20 may be configured as a holography display device. In this case, the image display unit 20 can be configured to include a light source and a spatial light modulator that modulates light from the light source. For example, as the spatial light modulator, SLM can be adopted. Specifically, a reflective spatial light phase modulator utilizing a liquid crystal known as LCOS can be used. SLM is an abbreviation for "Spatial Light Modulator", and LCOS is an abbreviation for "Liquid Crystal On Silicon-SLM".

Further, in the exemplary embodiment of the present disclosure, the configuration in which the user visually recognizes the external scene through the image display unit is not limited to a configuration in which the right display unit 22 and the left display unit 24 transmit outside light. For example, the disclosure is also applicable to an HMD configured to display an image in a state where an external scene cannot be visually recognized. Specifically, the present disclosure is applicable to an HMD configured to display a captured image by the camera 61, an image or CG generated based on this captured image, an image based on image data stored in advance or based on image data input from an outside, or the like. This kind of HMD can include a so-called "closed type" display device in which an external scene cannot be visually recognized. Further, as described in the exemplary embodiment of the present disclosure, AR display in which an image is superimposed on a real space and is displayed, or MR display in which an image captured in a real space and a virtual image are combined may be used. Alternatively, the present disclosure is applicable to an HMD configured to perform no processing, such as VR display, for displaying a virtual image. MR is an abbreviation for "Mixed Reality" and VR is an abbreviation for "Virtual Reality". For example, an HMD configured to display image data input from an outside or an analogue image signal is also, as a matter of course, encompassed as an application target of the present disclosure.

Additionally, instead of the image display unit 20, for example, an image display unit of another type such as an image display unit worn as a hat may be adopted, as long as the image display unit includes a display unit configured to display an image in correspondence to the left eye of a user, and a display unit configured to display an image in correspondence to the right eye of the user. Further, the display device may be configured, for example, as a head-mounted display built into a body protector tool such as a helmet. In this case, a positioning portion to be positioned on a body of the user, and a portion to be positioned to the configured portion may be a mounting portion.

Furthermore, each functional unit illustrated in FIG. 2 and FIG. 3 indicates a functional configuration, and a specific implementation is not particularly limited. In other words, hardware that individually corresponds to each of the functional units is not necessarily implemented, and a configuration is possible as a matter of course in which a single processor executes a program to enable functions of a plurality of functional units. Furthermore, in the above-described exemplary embodiment, some of the functions enabled by software may be enabled by hardware, or some of the functions enabled by hardware may be enabled by software. In addition, specific configurations of details of other units in the HMD 100, the PC 300 and the controller 400 may be modified as desired without departing from the spirit of the present disclosure.

Further, the control method of the display system 1 of the present disclosure can be achieved by causing the computer included in the display system 1 to execute a program corresponding to the control method of the display system 1. Furthermore, the program can also be recorded in a recording medium recorded to be readable by a computer. The recording medium can be a magnetic recording medium, an optical recording medium, or a semiconductor memory device. Specifically, the recording medium described above may be a portable or fixed recording medium, such as a flexible disk, a hard disk drive (HDD), a compact disk read only memory (CD-ROM), a digital versatile disk (DVD), a Blu-ray (registered trademark) disc, a magneto-optical disk, a flash memory, or a card-type recording medium. The recording medium described above may be a non-volatile storage, such as a random access memory (RAM), a read only memory (ROM), and a hard disk drive (HDD) that represent internal storages included in an image processing apparatus. The program corresponding to the control method of the display system 1 is stored in a server apparatus or the like, and thus the control method of the display system 1 can be achieved by downloading the program from the server apparatus to the display system 1.

What is claimed is:

1. A display system, comprising:
a robot;
a head-mounted display configured to display an image on a scene in a real space in an overlapped manner;
a first control unit configured to cause the head-mounted display to display a first guide image indicating a direction set based on the robot to correspond to the robot disposed in the real space, the first guide image indicating a movement speed or a grasping force of an arm of the robot;
an input unit configured to receive an input regarding an operation of the robot; and
a second control unit configured to cause the robot to operate corresponding to the input,
wherein on the arm of the robot, a coordinate system based on the arm of the robot is set,
the first control unit is configured to
cause the head-mounted display to display the first guide image indicating the coordinate system corresponding to a direction of the arm of the robot, and
cause the head-mounted display to display a second guide image corresponding to a prohibited region in the real space, and
when the arm of the robot is in the prohibited region, the input unit does not receive the input regarding the operation of the robot.

2. The display system according to claim 1,
wherein the robot includes a motion mechanism configured to at least move or rotate the arm of the robot with respect to the head-mounted display.

3. The display system according to claim 1,
wherein a plurality of arms of the robot and a plurality of coordinate systems each based on a corresponding one the plurality of arms of the robot are set for the robot, and
the first control unit is configured to identify a location and a direction of each of the plurality of arms of the robot, and cause the head-mounted display to display the first guide image corresponding to the position and the direction of each of the plurality of arms of the robot.

4. The display system according to claim 1,
wherein head-mounted the display includes an imaging unit, and
the first control unit is configured to
identify a location and a direction of the arm of the robot with respect to the head-mounted display, based on a captured image captured by the imaging unit, and
cause the head-mounted display to display the first guide image corresponding to the position and the direction of the arm of the robot.

5. The display system according to claim 4,
wherein the first control unit is configured to detect, from the captured image, an image marker provided at the arm of the robot to identify the location and the direction of the arm of the robot with respect to the head-mounted display.

6. The display system according to claim 5,
wherein a plurality of arms of the robot are set on the robot, and
the first control unit is configured to
detect, from the captured image, the image marker provided at each of the plurality of arms of the robot, and
identify the location and the direction of each of the plurality of arms of the robot with respect to the head-mounted display.

7. The display system according to claim 5,
wherein the first control unit is configured to
identify, based on a line-of-sight of a user wearing the head-mounted display on a head of the user, one of the image markers provided respectively at the arm of the robot, and
display the first guide image corresponding to the one image marker.

8. The display system according to claim 2,
wherein the first control unit is configured to determine a size of the first guide image in accordance with a distance between the head-mounted display and the arm of the robot.

9. The display system according to claim 1, comprising:
a display device having the head-mounted display; and
a control device communicably coupled to the robot and the display device, and including the first control unit.

10. The display system according to claim 1,
wherein the first control unit is configured to cause the head-mounted display to update display of the first guide image corresponding to the operation of the robot.

11. The display system according to claim 1,
wherein the first control unit is configured to cause the head-mounted display to display a state image indicating a state of the robot to correspond to the robot installed in the real space.

12. The display system according to claim 1,
wherein the robot has at least a plurality of joints or a plurality of shafts.

13. A control method for a display system including a robot, a head-mounted display configured to display an image on a scene in a real space in an overlapped manner, a first control unit configured to cause the head-mounted display to display an image, an input unit configured to receive an input regarding an operation of the robot, and a second control unit configured to cause the robot to operate corresponding to the input, the method comprising:
causing, by the first control unit, the head-mounted display to display a first guide image indicating a coordinate system based on an arm of the robot disposed in the real space and corresponding to a direction of the arm of the robot, the first guide image indicating a movement speed or a grasping force of the arm of the robot;
causing, by the first control unit, the head-mounted display to display a second guide image corresponding to a prohibited region in the real space;
causing, by the second control unit, the robot to operate corresponding to the input; and
when the arm of the robot is in the prohibited region, causing the input unit not to receive the input regarding the operation of the robot.

* * * * *